(12) United States Patent
Nilles et al.

(10) Patent No.: US 6,246,222 B1
(45) Date of Patent: Jun. 12, 2001

(54) SWITCHING DC-TO-DC CONVERTER AND CONVERSION METHOD WITH ROTATION OF CONTROL SIGNAL CHANNELS RELATIVE TO PARALLELED POWER CHANNELS

(75) Inventors: Jeff L. Nilles, Los Altos; Darryl Byron Phillips, Milpitas, both of CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/650,881

(22) Filed: Aug. 30, 2000

(51) Int. Cl.$^7$ ........................................... G05F 1/40
(52) U.S. Cl. ............................................. 323/283
(58) Field of Search ................................ 323/282, 283, 323/284, 285, 288, 234, 351

(56) References Cited

U.S. PATENT DOCUMENTS

| | | | |
|---|---|---|---|
| 5,850,137 | * 12/1998 | Takimoto et al. | 320/164 |
| 5,939,871 | * 8/1999 | Tanaka | 323/285 |
| 5,959,441 | 9/1999 | Brown | 323/282 |
| 6,025,706 | * 2/2000 | Takimoto et al. | 323/282 |
| 6,147,526 | * 11/2000 | Skelton et al. | 327/134 |
| 6,154,015 | * 11/2000 | Ichiba | 323/225 |

* cited by examiner

Primary Examiner—Adolf Deneke Berhane
(74) Attorney, Agent, or Firm—Girard & Equitz LLP

(57) ABSTRACT

A DC-to-DC converter having multiple power channels and a switching controller which generates a pulse-width modulated control signal for each power channel, and a switching controller for use in (and a method for generating power switch control signals for) such a converter. The control signals are generated in response to trigger signal trains generated by trigger channels. The trigger channels rotate relative to the power channels so that the control signals are generated in response to a sequence of trigger channel states. In some embodiments, the controller has one control signal channel and one trigger channel for each power channel. In other embodiments, there are N power channels, N control signal channels, and M reset channels (each for generating a trigger signal train), where M is an integer greater than N. The extra channel or channels is used for preventing rotation errors which would otherwise delay opening of the closed power switches. Preferably, the sequence of trigger channel states is a periodic sequence in which each trigger channel is provided sequentially to a repeating sequence of the control signal channels, but it is alternatively a non-periodic sequence in which each trigger channel is provided equally on a time-averaged basis to each control signal channel. In some embodiments, each time interval between rotations is sufficiently long to avoid significant problems due to rotation errors which can result from rotation of trigger channels during a power switch cycle). In some embodiments, the controller includes logic circuitry for preventing operation at 100% duty cycle which would otherwise cause energy transfer problems in some applications, such as boost, inverting and transformer coupled circuits.

65 Claims, 10 Drawing Sheets

SWITCHING DC-TO-DC CONVERTER AND CONVERSION METHOD WITH ROTATION OF CONTROL SIGNAL CHANNELS RELATIVE TO PARALLELED POWER CHANNELS

BACKGROUND OF THE INVENTION

1. Field of the Invention

The present invention relates to switching DC-to-DC converters having multiple power channels (either simple-paralleled or interleaved-paralleled) and multiple control signal channels, in which the duty cycle of each power channel is controlled by one of the control signal channels. Specifically, the invention employs rotation of a set of control signal channels (relative to a set of power channels) to reduce the differences between the time-averaged currents through the individual power channels.

2. Description of the Related Art

One type of conventional switching power supply circuitry which employs voltage mode control to achieve output voltage regulation is a DC-to-DC converter including a voltage mode switching controller chip, and circuitry external to the controller chip which defines multiple, paralleled power channels. The controller chip includes multiple control signal channels (one for each power channel), each control signal channel generating a pulse width modulated power switch control signal ("PWM switch control" signal) in response to a ramped voltage and a feedback signal indicative of the DC-to-DC converter's output potential. Typically, each PWM switch control signal is a binary signal having periodically occurring leading edges, and trailing edges which occur at times determined by the instantaneous value of the feedback signal. Typically, the ramped voltage signals for all the channels increase periodically (with the same period for all channels) at a fixed ramp rate, and their waveforms are identical (to the extent possible and practical), except that each may have a different phase than the others. In interleaved PWM DC-to-DC converters, the ramped voltage signals and PWM switch control signals are out of phase with respect to each other. In non-interleaved PWM DC-to-DC converters having multiple channels, the ramped voltage signals and PWM switch control signals are in phase with respect to each other.

Each PWM switch control signal controls the power switch of a different one of the parallel power channels. For example, in PWM DC-to-DC converters, multiple PWM switch control signals are generated (in parallel) by providing multiple ramped voltages in parallel to comparator circuitry. Typically, it is desired that the PWM switch control signals all have the same duty cycle. Often, the PWM switch control signals are generated in a voltage mode switching controller chip, and asserted to external power switch circuitry (comprising multiple power switches) to cause the latter circuitry to determine the amplitude of the DC output voltage of the DC-to-DC converter. An advantage of providing multiple channels (each channel including a power switch) rather than a single channel is that use of multiple channels allows the DC-to-DC converter to be implemented with smaller power stage inductors, smaller input filter inductors, and smaller output capacitors, thus providing an overall improved step-load transient response and reduced physical size.

However, when implementing a multi-channel switching controller (especially when implementing it as an integrated circuit or part of an integrated circuit), process and temperature variations typically cause variations in the characteristics (e.g., maximum amplitude) of the ramped voltages generated in the individual control signal channels. Such variations typically cause or contribute to undesired variation from power channel to power channel in the time-averaged duty cycle of each power switch, and in the time-averaged current drawn from each power channel. This problem is sometimes referred to as "current hogging" by one or more power channels, or as the "hot channel" problem. When implementing a multi-channel DC-to-DC converter, a variety of factors typically contribute to the hot channel problem, including mismatches among the external power switches or other elements of the power channel circuitry external to the controller, as well as variations (from control signal channel to control signal channel) in implementation of the controller.

When implementing a multi-channel DC-to-DC converter, it is desirable to reduce or eliminate the hot channel problem, thus reducing mismatches causing any of the power channels from drawing significantly time-averaged current than any of the other power channels. Preferably, the converter is implemented so that all the power channels draw at least approximately the same time-averaged current.

FIG. 1 is a simplified circuit diagram of a conventional DC-to-DC converter which employs feedback of a type known as voltage-mode feedback which exhibits the "hot" channel problem in DC-to-DC converters having multiple (parallel) power channels. Specifically, mismatches in the slopes of ramped voltage $V_{osc}$ output from oscillator 2 for each channel of controller chip 1, can result in mismatches in the current conducted through the inductor L, switch N1 and diode D for each channel of the circuit. The degree of mismatch depends on the ramp rate of voltage $V_{osc}$, the particular implementation of oscillator 2 and comparator 8, as well as other circuitry within and external to controller chip 1. Thus, in a multi-channel implementation of the FIG. 1 circuit including comparators (such as comparator 8) and circuitry for generating ramped voltages (such as voltage $V_{osc}$) within each control signal channel, differences in $V_{osc}$, inductor value, switch resistance and diode forward voltage can cause the "hot" channel problem by inducing variations (from power channel to power channel) in the time-averaged duty cycles of the power switches.

The FIG. 1 circuit includes voltage mode switching controller 1 (implemented as an integrated circuit) and buck converter circuitry external to controller chip 1. The buck converter circuitry comprises NMOS transistor N1 (which functions as a power switch), inductor L, Schottky diode D, capacitor $C_{out}$, feedback resistor divider $R_{F1}$ and $R_{F2}$, compensation resistor $R_c$, and compensation capacitor $C_c$, connected as shown. The FIG. 1 circuit produces a regulated DC output voltage $V_{out}$ across load $R_o$, in response to input DC voltage $V_{in}$.

Controller chip 1 includes oscillator 2 (having a first output and a second output), comparator 8, driver 6 which produces an output potential $V_{DR}$ at pad 12 (to which the gate of switch N1 is coupled), latch 4 (having "set" terminal coupled to oscillator 2, "reset" terminal coupled to the output of comparator 8 (having a first input coupled to the second output of oscillator 2 and a second input coupled to pad 13 and the output of error amplifier 10, and an output coupled to the input of driver 6), error amplifier 10 (having a non-inverting input maintained at reference potential $V_{ref}$), digital-to-analog conversion circuit 10A (which maintains the noninverting input of amplifier 10 at analog reference potential $V_{ref}$, in response to digital control bits VIDCODE which determine the reference potential $V_{ref}$ and which are received from an external source at one or more pads 16).

Pad 13 of controller chip 1 is at potential $V_c$, which is determined by the output of error amplifier 10 (in turn determined by the difference between the instantaneous potential at Node A and the reference potential $V_{ref}$) and the values of external resistor $R_c$ and capacitor $C_c$, connected to pad 13 as shown. Reference potential $V_{ref}$ is set in response to bits VIDCODE and is normally not varied during use of the circuit. In order to set (or vary) the regulated level of the output voltage $V_{out}$, resistors $R_{F1}$ and $R_{F2}$ with the appropriate resistance ratio $R_{F1}/R_{F2}$ are employed.

Oscillator 2 asserts a clock pulse train (having fixed frequency and waveform as indicated) at its first output, and each positive-going leading edge of this pulse train sets latch 4. Each time latch 4 is set, the potential $V_{DR}$ asserted by driver 6 to the gate of transistor N1 causes transistor N1 to turn on, which in turn causes current $I_L$ from the source of N1 to increase in ramped fashion (more specifically, the current $I_L$ increases as a ramp when transistor N1 is on, and is zero when transistor N1 is off. The current through diode D is zero when N1 is on, it increases sharply when N1 switches from on to off, then falls as a ramp while N1 is off, and then decreases sharply to zero when N1 switches from off to on). Although transistor N1 turns on at times in phase with the periodic clock pulse train, it turns off at times (which depend on the relation between reference potential $R_{ref}$ and the instantaneous potential at Node A) that have arbitrary phase relative to the pulses of the periodic clock pulse train.

Oscillator 2 asserts ramped voltage $V_{osc}$ (which periodically increases at a fixed ramp rate and then decreases, with a waveform as indicated) at its second output. The ramped voltage is asserted to the non-inverting input of comparator 8.

Error amplifier 10 asserts the potential $V_c$ to the inverting input of comparator 8. When $V_c=V_{osc}$ (after latch 4 has been set), the output of comparator 8 resets latch 4, which in turn causes the potential $V_{DR}$ asserted by driver 6 to the gate of transistor N1 to turn off transistor N1. Thus, by the described use of both of the signals output from oscillator 2, and feedback asserted to error amplifier 10 from Node A, controller chip I switches transistor N1 on and off with timing that regulates the output potential $V_{out}$ of the FIG. 1 circuit.

FIG. 1A is a simplified circuit diagram of a conventional DC-to-DC converter which employs feedback of a type called current-mode feedback which can be used to address the "hot" channel problem in DC-to-DC converters having multiple (parallel) power channels. Specifically, the feedback provided through pads 14 and 14A to controller chip 1 of FIG. 1A provides a ramped voltage $V_s$ which is compared with the feedback signal indicative of the DC-to-DC converter's potential(allowing control of the time-averaged duty cycle of external power switch N1). The value and slope of $V_s$ depends on the current through inductor L (and thus through resistor $R_s$), current sense amplifier 11, and the potentials at the converter's input and output and the potentials at other circuit elements within and external to controller chip 1A. The voltage $V_{osc}$ adjusts the effective ramp rate slightly for improved stability through a technique called "slope compensation." The adjusted feedback signal $V_c-V_{osc}$ controls the peak value the inductor is allowed to ramp up to through the external power switch N1, as indicated by the current feedback signal $V_s$. Thus, in a multi-channel implementation of the FIG. 1A circuit including a comparator (such as comparator 8) and current feedback circuitry for generating a ramped voltage (such as voltage $V_s$) within each control signal channel and at least one pad (such as pads 14 and 14A) for feedback from each power channel to each control signal channel, use of a single feedback signal $V_c$ to set the same peak switch current in each power channel can address the "hot" channel problem by causing the controller to set the same time-averaged current through all the power switches.

The FIG. 1A circuit includes current mode switching controller 1A (implemented as an integrated circuit) and buck converter circuitry external to controller chip 1A. The buck converter circuitry comprises NMOS transistor N1 (which functions as a power switch), inductor L, current sense resistor $R_s$, Schottky diode D, capacitor $C_{out}$, feedback resistor divider $R_{F1}$, and $R_{F2}$, compensation resistor $R_c$, and compensation capacitor $C_c$, connected as shown. The FIG. 1A circuit produces a regulated DC output voltage $V_{out}$ across load $R_o$, in response to input DC voltage $V_{in}$.

Controller chip 1A includes oscillator 2 (having a first output and a second output), comparator 8, driver 6 which produces an output potential $V_{DR}$ at pad 12 (to which the gate of switch N1 is coupled), latch 4 (having "set" terminal coupled to oscillator 2, "reset" terminal coupled to the output of comparator 8, and an output coupled to the input of driver 6), error amplifier 10 (having a non-inverting input maintained at reference potential $V_{ref}$), digital-to-analog conversion circuit 10A (which maintains the noninverting input of amplifier 10 at analog reference potential $V_{ref}$, in response to digital control bits VIDCODE which determine the reference potential $V_{ref}$ and which are received from an external source at one or more pads 16), circuit 9 (having a first input coupled to the second output of oscillator 2, a second input coupled to pad 13, and an output coupled to the inverting input of comparator 8), and current sense amplifier 11 (having a non-inverting input coupled through pad 14 to the node between inductor L and resistor $R_s$, an inverting input coupled through pad 14A to the buck converter circuitry's output node, and an output coupled to the non-inverting input of comparator 8).

Pad 13 of controller chip 1A is at potential $V_c$, which is determined by the output of error amplifier 10 (in turn determined by the difference between the instantaneous potential at Node A and the reference potential $V_{ref}$) and the values of external resistor $R_c$ and capacitor $C_c$, connected to pad 13 as shown. Reference potential $V_{ref}$ is set in response to bits VIDCODE and is normally not varied during use of the circuit. In order to set (or vary) the regulated level of the output voltage $V_{out}$, resistors $R_{F1}$ and $R_{F2}$ with the appropriate resistance ratio $R_{F1}/R_{F2}$ are employed.

Oscillator 2 asserts a clock pulse train (having fixed frequency and waveform as indicated) at its first output, and each positive-going leading edge of this pulse train sets latch 4. Each time latch 4 is set, the potential $V_{DR}$ asserted by driver 6 to the gate of transistor N1 causes transistor N1 to turn on, which in turn causes current $I_L$ from the source of N1 to increase in ramped fashion (more specifically, the current $I_L$ increases as a ramp when transistor N1 is on, and is zero when transistor N1 is off. The current through diode D is zero when N1 is on, it increases sharply when N1 switches from on to off, then falls as a ramp while N1 is off, and then decreases sharply to zero when N1 switches from off to on). Although transistor N1 turns on at times in phase with the periodic clock pulse train, it turns off at times (which depend on the relation between reference potential $R_{ref}$ and the instantaneous potential at Node A) that have arbitrary phase relative to the pulses of the periodic clock pulse train.

Oscillator 2 optionally also asserts ramped voltage $V_{osc}$ (which periodically increases at a fixed ramp rate and then decreases, with a waveform as indicated) at its second output. Circuit 9 asserts the potential $V_c-V_{osc}$ (or $V_c$) to the inverting input of comparator 8.

The non-inverting input of comparator 8 is at potential $V_s=I_L R_s$, which is the output of current sense amplifier 11, and which increases in ramped fashion in response to each "set" of latch 4 by oscillator 2. When $V_s=V_c-V_{osc}$ (or $V_s=V_c$) after latch 4 has been set, the output of comparator 8 resets latch 4, which in turn causes the potential $V_{DR}$ asserted by driver 6 to the gate of transistor N1 to turn off transistor N1. Thus, by the described use of all of the signals output from oscillator 2, current feedback to current sense amplifier 11, and feedback asserted to error amplifier 10 from Node A (through pad 15), controller chip 1A switches transistor N1 on and off with timing that regulates the output potential $V_{out}$ of the FIG. 1A circuit.

In a multi-channel implementation of FIG. 1A, the feedback through pads 14 and 14A of FIG. 1A (and counterparts thereto which are connected to the other power channels) could address the "hot channel" problem. In such multi-channel implementation, the controller would have only a single external pin (at pad 15) for feedback indicative of the output node (there would be one comparator for each control signal channel and the output of a single error amplifier 10 would be coupled to all comparators) but would have several external pins, each pair of external pins corresponding to pads 14 and 14A, each coupled to a different one of the power channels. Although the feedback from each power channel to a corresponding control signal channel could address the hot channel problem by reducing variations (from power channel to power channel) in the time-averaged power switch duty cycles and time-averaged currents drawn from the individual power channels, the feedback technique has the disadvantages that it requires a complex controller design with multiple external pins (two for each power channel) dedicated to addressing the hot channel problem, and requires current sense resistors such as resistor $R_s$ (one for each power channel) for generating the required feedback signals for addressing the hot channel problem.

Other techniques have been proposed for addressing the hot channel problem. For example, U.S. patent application No. 09/231,046, filed Jan. 14, 1999 and assigned to the assignee of the present invention, discloses ramped voltage generation circuitry for use in a switching controller for a DC-to-DC converter having multiple power channels. The ramped voltage generation circuitry generates multiple ramped voltages, each having a different phase. The maximum amplitude of each ramped voltage is controlled in the following manner to be uniform. In response to a clock signal (one clock signal per control signal channel), ramped voltage generating capacitors (one or two per control signal channel) are periodically charged and discharged. For each control signal channel, a feedback loop (comprising an amplifier, capacitor, transistor, and current mirror) controls the rate at which the ramped voltage generating capacitor (for the relevant control signal channel) charges, using feedback (provided during a short interval of time immediately before the ramped voltage generating capacitor discharges) indicative of the voltage across the ramped voltage generating capacitor. Although each ramped voltage generating capacitor charges periodically and discharges periodically, the feedback tends to move the level of each ramped voltage signal toward a desired maximum amplitude (during the short interval of time just before the ramped voltage generating capacitor discharges). However, this system addresses the hot channel problem in a manner requiring complex feedback circuitry within ramped voltage generation circuitry in the controller chip.

U.S. Pat. No. 5,959,441, issued Sep. 28, 1999 (assigned to Dell USA, L.P.), discloses another technique for addressing the hot channel problem. This technique employs a voltage mode control circuit, including amplifier 220 of FIG. 2A, a first integrator (comprising elements 241 and 223 of FIG. 2A), and a second integrator (comprising elements 238 and 235), which responds to feedback from each switch control channel to reduce the difference between the time-averaged duty cycles of the power channels. However, the system of U.S. Pat. No. 5,959,441 addresses the hot channel problem in a manner requiring complex feedback circuitry within the control signal channels.

Another technique proposed for addressing the hot channel problem is the technique of current sharing between the control signal channels (whether the paralleled power switch control signals are interleaved or non-interleaved). To implement current sharing, current sharing circuitry generates individual power channel current signals (indicative of the current drawn from each power channel), an average current signal (indicative of the average of the currents drawn from the power channels), and channel current error signals (indicative of the difference between the individual power channel current drawn from each power channel and the average current drawn from all power channels. Each power switch control signal (one for each power channel) is generated in response to two feedback signals: the current error signal (for the appropriate channel) and a second feedback signal indicative of the output potential of the DC-to-DC converter relative to a reference potential. Thus, the DC-to-DC converter achieves a desired output potential with increased current sharing among the channels (reduced differences between the time-averaged currents drawn by the individual power channels). However, the current sharing technique for addressing the hot channel problem has disadvantages, including that it requires controller chip pins dedicated to receiving feedback from the individual power channels (in order to implement current sharing), and it requires feedback circuitry within the controller chip for generating the current error signals (one for each control signal channel) and employing the current error signals as feedback.

Designing a multi-channel DC-to-DC converter in accordance with the present invention reduces the hot channel problem while eliminating the need for feedback from individual power channels or complex feedback circuitry within the individual control signal channels of the controller chip.

Some conventional multi-channel DC-to-DC converters include a switching controller chip, and power channel circuitry (e.g., boost converter circuitry) other than buck converter circuitry external to the controller chip. Some conventional multi-channel DC-to-DC converters employ switching controllers which receive only feedback indicative of the potential at the converter's output node (such as the feedback supplied to controller 1 of FIG. 1 from Node A of FIG. 1), and do not receive feedback indicative of the current through the inductor of each individual power channel (e.g. the feedback supplied through pads 14 and 14A of FIG. 1A). Another conventional multichannel DC-to-DC converter includes a switching regulator chip (which performs the functions of a switching controller and also includes internal power switches), and additional circuitry external to the regulator chip (in contrast with a converter that includes a controller chip having internal control signal channel circuitry, and external power channel circuitry outside the controller chip). It is contemplated that all such conventional converters can be improved in accordance with the invention.

SUMMARY OF THE INVENTION

In preferred embodiments, the invention is a DC-to-DC converter having N power channels (each including a power switch), where N is an integer greater than one, and a switching controller having N control signal channels. Each control signal channel generates a power switch control signal for a different one of the power channels. Other aspects of the invention are a switching controller for use in such a converter, and method for generating power switch control signals for a DC-to-DC converter. Typically, the controller is implemented as an integrated circuit, the power channels are external to the controller and are connected in parallel between an output node (at which the converter produces an output potential) and an input node, each power channel has a power switch coupled to receive a different one of the power switch control signals.

In a first class of embodiments, there is a reset signal generating circuit (referred to herein as a "reset" channel) for each of the N control signal channels. Each reset channel is configured to generate a train of reset signals in response to comparison of a ramped voltage with a feedback signal indicative of the output potential. Each control signal channel is configured to generate a pulse-width modulated power switch control ("PWM switch control") signal (for one of the power channels) in response to a train of periodic "set" signals and a train of the reset signals. Rotation circuitry within the controller rotates the reset channels relative to the power channels (and the control signal channels), so that the controller generates the PWM switch control signals in response to a sequence of reset channel states. Preferably, such sequence of reset channel states is a periodic sequence in which each reset channel is coupled sequentially to a repeating sequence of the control signal channels, but it is alternatively a random sequence (or other sequence) in which each reset channel is provided equally (coupled equally on a time-averaged basis) to each of the control signal channels (each control signal channel has equal time-averaged access to each train of reset signals). For example, in one "three-channel" embodiment (in which N=3), the rotation circuitry couples the reset channels to the control signal channels in the following repeating sequence: the first, second, and third reset channels respectively to the first, second, and third control signal channels, then the second, third, and first reset channels respectively to the first, second, and third control signal channels, and then the third, first, and second reset channels respectively to the first, second, and third control signal channels.

Throughout this disclosure, including in the claims, we use "rotation" of a first set of circuits or circuit elements (e.g., a set of reset channels) relative to a second set of circuit elements (e.g., a set of control signal channels) in a broad sense denoting reassignment of elements of the first set to elements of the second set, either as one step of a periodic reassignment cycle or as one event in a random (or other) sequence of reassignments by which each element of the second set has equal time-averaged access to each element of the first set.

In all embodiments of the invention, the time interval between rotations should be sufficiently short to reduce to acceptable levels the differences between the time-averaged duty cycles of the power channels (and thus the difference between the steady-state operating temperatures of the power switches of, and the output currents drawn from, the power channels), or to prevent any of the power channels from drawing significantly more time-averaged current than any of the other power channels and maintain the steady-state temperature of each power switch at a substantially constant temperature and each power switch at the same system temperature.

In some embodiments of the invention, the time interval between rotations (e.g., rotation period) is caused to be sufficiently long (e.g., longer than the period of the power switch duty cycle) to avoid significant problems due to "rotation errors" (which can result from rotation of reset channels during a power switch cycle), especially those which delay the opening of any closed power switches or otherwise cause undesirably high current in any of the power channels. A "rotation error" occurs (in any control signal channel) when substitution of a second reset channel for a first reset channel (during a power switch cycle) causes the power switch control signal produced by the control signal channel to keep a power switch closed for a longer or shorter time (after the power switch is closed at the start of the cycle) than if the substitution did not occur (so that the control signal channel operated with the first reset channel and not the second reset channel). A rotation error which causes premature opening of a power switch is less serious than one which delays the opening of the power switch, since the latter type of rotation error may cause abnormally high current in the relevant power channel (either causing the power channel inductor to saturate or requiring use of a larger, more expensive inductor). In some embodiments of the invention, rotation errors are not significant (e.g., they occur infrequently) and can be tolerated.

The time interval between rotations (of "reset" channels relative to power channels) depends on the heating characteristics of the power switches of the power channels. In typical cases in which the power switches are MOSFET devices and the PWM duty cycle frequency is on the order of 10 KHz to 10 MHz (so that the period of the PWM duty cycle is on the order of 100 ns to 10,000 ns), the time interval between rotations is on the order of 10 ms.

In another class of embodiments having N power channels and N control signal channels, the controller has M reset channels (each for generating a train of reset signals), where M is an integer greater than N. For convenience, we refer to embodiments in this class as "extra reset channel" embodiments. An important advantage of each extra reset channel embodiment is that it allows elimination of rotation errors by providing an extra trigger channel to rotate into service to allow rotation without swapping with a trigger channel that is still in operation. The channel rotated out of service then has time to complete its cycle and reset to an initial state before being rotated back into use. Also, the extra reset channel embodiments allow use of simple digital rotation circuitry (e.g., a multiplexer comprising a logic gate array) instead of the relatively complex analog multiplexer circuitry typically employed to implement the rotation circuitry of the above-mentioned embodiments having N reset channels. Each control signal channel generates a PWM switch control signal for one of the power channels in response to a train of reset signals. Only N of the reset channels are selected at any instant during operation of the controller (only N trains of reset signals are used at a time). A set of N switch control signals is generated in response to each set of N selected reset channels. Circuitry (preferably, simple digital logic circuitry) within the controller selects reset channels and rotates the selected reset channels relative to the power and control signal channels, so that the controller generates switch control signals in response to a sequence of selected reset channel states. Each of the selected reset channel states is determined by a mapping of N of the reset channels to N different ones of the control signal channels.

Preferably, the sequence of selected reset channel states is a periodic (rotating) sequence, but alternatively it is a random sequence (or other sequence) in which each reset channel is provided equally to each of the control signal channels (each control signal channel has equal time-averaged access to each reset channel). In typical extra reset channel embodiments, M=N+1. For example M=4 and N=3, to implement an interleaved PWM DC-to-DC converter having three power channels and PWM switch control signals 120 degrees out of phase with respect to each other.

In some embodiments in which the controller generates each PWM 10 power switch control signal in response to trains of "set" and "reset" signals, the reset signals occur periodically and the "set" signals have time varying phase. The "set" signals are generated in response to comparison of a ramped voltage with a feedback signal indicative of the potential at the converter's output node. Rotation circuitry within the controller rotates the "set" signal generation channels, rather than the "reset" channels as described above, relative to the power channels. The controller generates multiple PWM switch control signals in response to a sequence of set channel states (rather than reset channel states). More generally, the inventive controller has at least two "trigger" signal channels ("trigger" channels), each of which generates a train of trigger signals (e.g., set signals or reset signals) having time-varying phase in response to comparison of a ramped voltage with a feedback signal indicative of the output potential of a DC-to-DC converter (having multiple power channels). Rotation circuitry within the controller rotates the trigger channels relative to the power channels. The controller generates PWM switch control signals in response to a sequence of trigger channel states.

In each embodiment of the invention, the time interval between rotations of trigger channels (e.g., set or reset channels) relative to power channels is selected based on the heating characteristics of the power switches of the power channels.

In some embodiments of the invention (including preferred implementations of "extra reset channel" embodiments or other "extra trigger channel" embodiments), the trigger channels include 100% duty cycle prevention circuitry configured to prevent 100% duty cycle operation, which would otherwise delay opening of any of the power switches. 100% duty cycle is undesirable in boost, inverting, and transformer coupled implementations, where energy is transferred to an output in the second half of each cycle. This circuitry can also be used to prevent glitches or rotation errors near 100% duty cycle where necessary due to the specific construction used for the digital rotation and ramp generation circuitry. In preferred embodiments, each trigger channel includes a comparator which generates a raw trigger signal train in response to comparison of a ramped voltage and a feedback signal indicative of the DC-to-DC converter output potential, and the 100% duty cycle prevention circuitry includes simple logic circuitry for each trigger channel which generates the trigger signal train (for such channel) in response to the raw trigger signal train (for such channel) by introducing dead times into the raw trigger signal train. Such dead times effectively force the output of the channel's comparator (at an appropriate time) to a level which causes the power switch being controlled by the channel (after a rotation) to be in an open (non-conducting) state when the ramped voltage for the channel first begins to ramp up after the rotation. This prevents 100% duty cycle operation which could otherwise cause the power switch to remain closed for an abnormally long time due to the rotation.

Another aspect of the invention is a switching controller including at least one counter (for generating at least one count signal), N control signal channels and multiple trigger signal channels, for use in a DC-to-DC converter having N power channels (each including a power switch), where N is an integer greater than one. Each trigger signal channel can be enabled to generate a train of trigger signals. The control signal channels generate PWM power switch control signals in response to the trains of trigger signals (preferably, each of the control signal channels generates a PWM power switch control signal in response to a sequence of the trains of trigger signals). Each trigger channel includes a comparator which generates a trigger signal train in response to comparison of a ramped voltage and a feedback signal indicative of the DC-to-DC converter output potential. The controller includes logic circuitry for generating periodically occurring ramp control signals in response to the at least one count signal, and ramp signal generation circuitry for generating the ramped voltages in response to the ramp control signals.

Another aspect of the invention is a method for controlling a switching DC-to-DC converter having N power channels and an output node (at which the converter asserts an output potential), where N is an integer greater than one, the method including the steps of:

employing multiple trigger channels to generate trains of trigger signals (e.g., reset or set signals), wherein each of the trains is generated in response to comparison of a ramped voltage with a signal indicative of the output potential; and generating N pulse-width modulated power switch control signals, wherein each of the power switch control signals is for controlling a different one of the power channels, and the power switch control signals are generated in response to a sequence of trigger channel states.

Each of the trigger channel states is determined by a unique one-to-one mapping of the power switch control signals to a set of N of the trigger channels, such that each power switch control signal is generated in response to a sequence of different ones of the trigger signal trains. Preferably, the sequence of trigger channel states is a periodic sequence in which each trigger channel is employed sequentially to generate a repeating sequence of power switch control signals, but it is alternatively a random sequence (or other sequence) in which each trigger channel is employed equally, on a time-average basis, to generate each of the power switch control signals (e.g, circuitry for generating each power switch control signal has equal time-averaged access to each trigger channel).

DETAILED DESCRIPTION OF THE PREFERRED EMBODIMENTS

Figure 1:
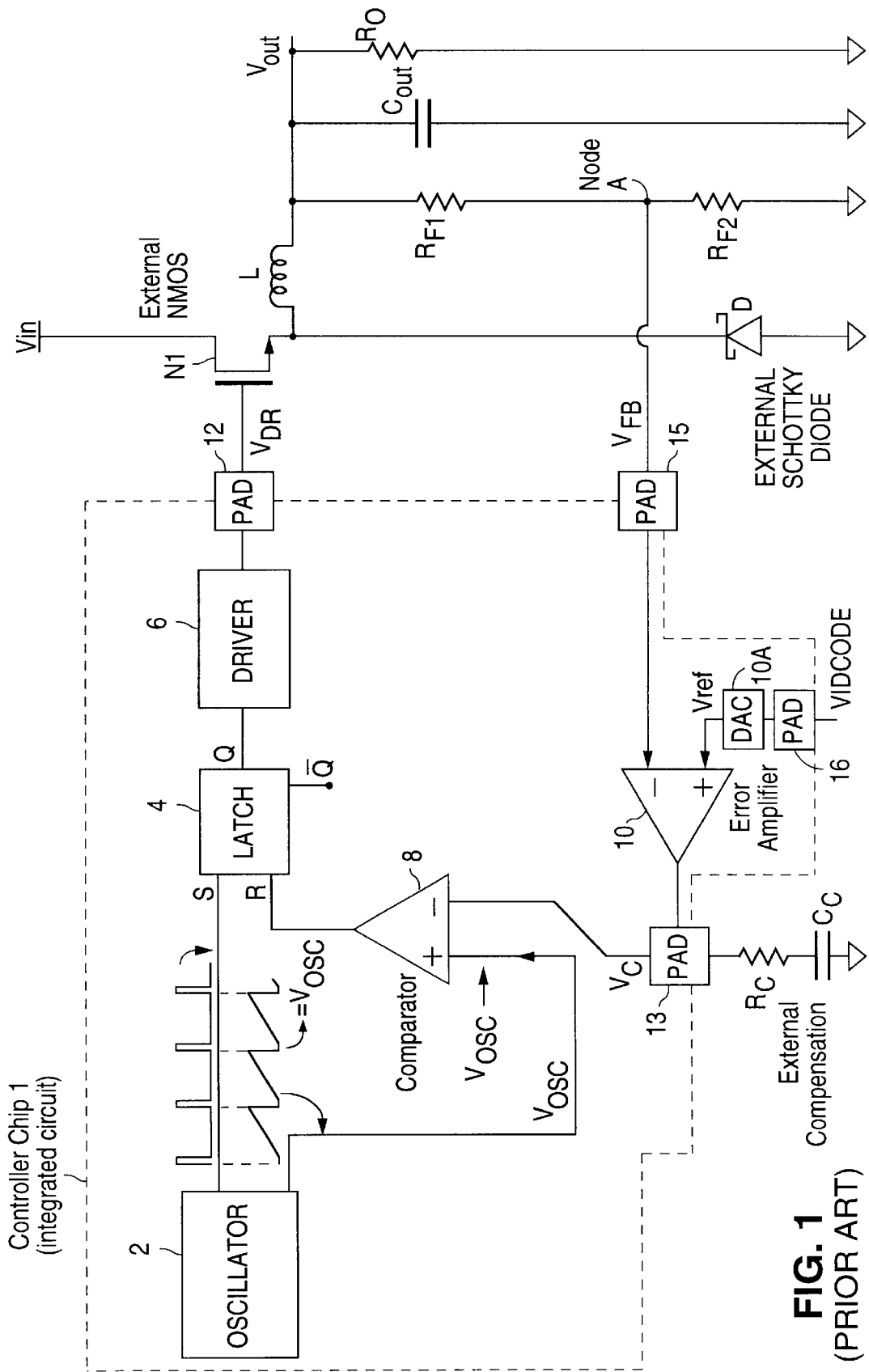
FIG. 1 is a simplified schematic diagram of a conventional voltage-mode DC-to-DC converter which uses a ramped voltage to generate a PWM power switch control signal ($V_{DR}$) for a power switch (transistor N1).
Figure 1A:
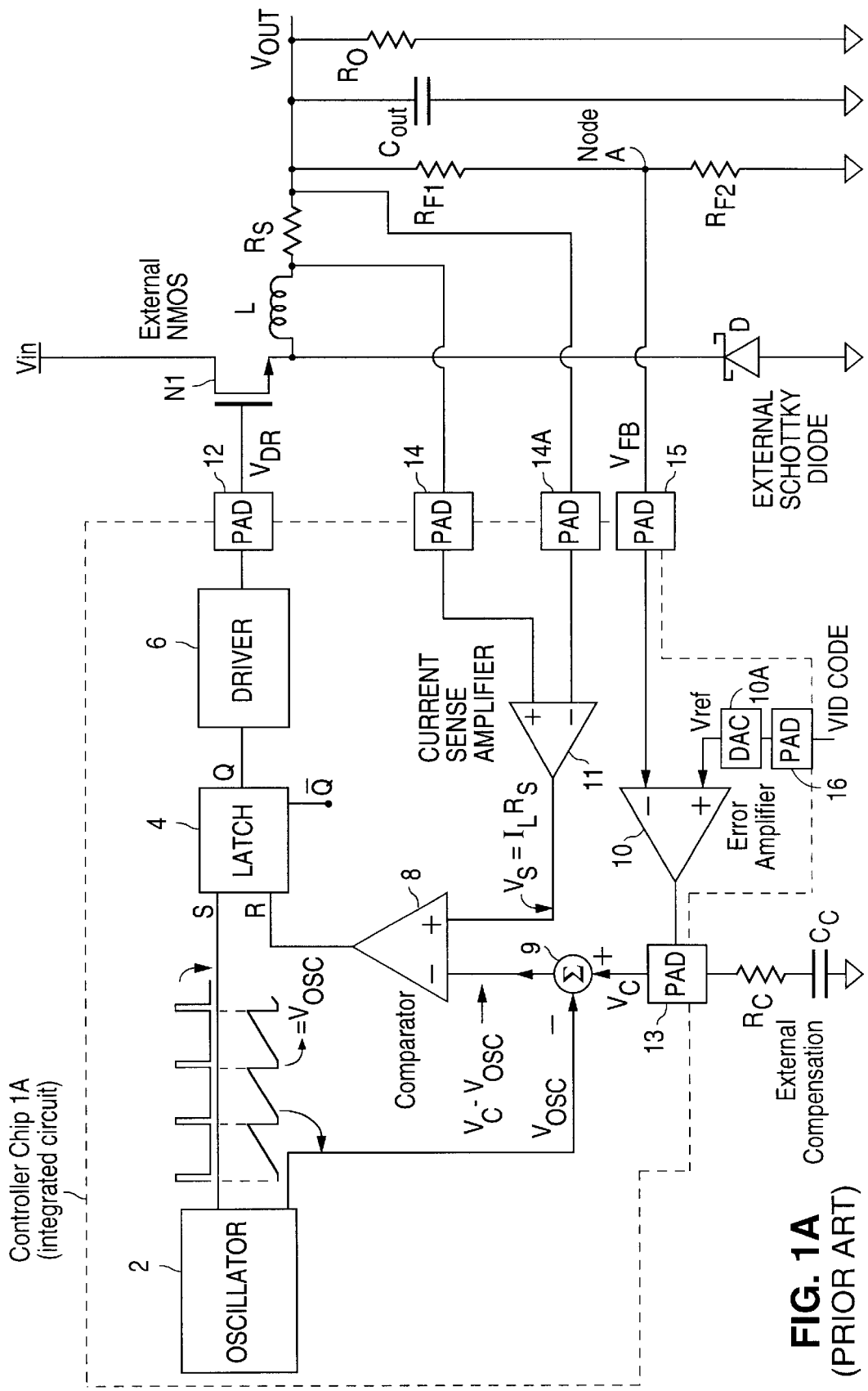
FIG. 1A is a simplified schematic diagram of a conventional current mode DC-to-DC converter which uses a current feedback signal as a ramped voltage to generate a PWM power switch control signal ($V_{DR}$) for a power switch (transistor N1).
Figure 2:
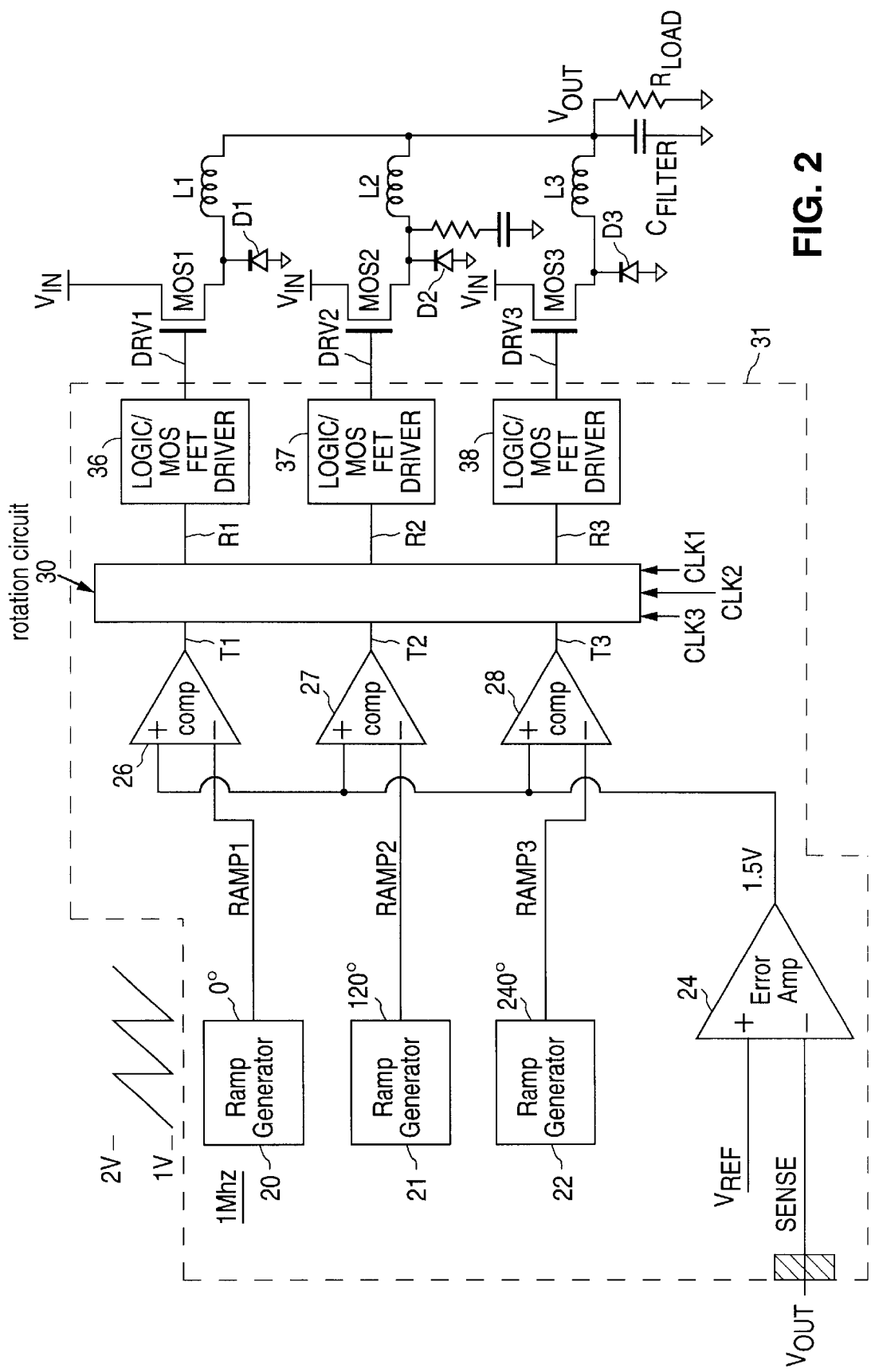
FIG. 2 is a diagram, partially a block diagram and partially a simplified schematic diagram, of a preferred embodiment of a DC-to-DC controller designed in accordance with the invention.

A preferred embodiment of the invention will be described with reference to FIGS. 2–4. The DC-to-DC converter of FIG. 2 has three power delivery channels (each including a different one of power switches MOS1, MOS2, and MOS3), and comprises switching controller chip 31, and buck converter circuitry external to controller chip 31.

The external buck converter circuitry asserts output potential $V_{out}$ at its output node in response to input potential $V_{in}$ at its input node, and has three identical power delivery channels connected in parallel. The input potential ($V_{in}$) is 10 volts in a typical implementation. Capacitor $C_{filter}$ is connected between the output node and ground. Resistance $R_{load}$ (between the output node and ground) represents the load. The first power delivery channel comprises power switch MOS1 (an NMOS transistor whose gate is coupled to receive signal DRV1 and whose drain is coupled to the input node) which is controlled by assertion of signal DRV1 from controller chip 31 to its gate; inductor L1 connected between the source of MOS1 and the output node; and Schottky diode D1 connected between the source of MOS1 and ground. The second power delivery channel comprises power switch MOS2 (an NMOS transistor whose gate is coupled to receive signal DRV2 and whose drain is coupled to the input node) which is controlled by assertion of signal DRV2 from controller chip 31 to its gate; inductor L2 connected between the source of MOS2 and the output node; and Schottky diode D2 connected between the source of MOS2 and ground. The third power delivery channel comprises power switch MOS3 (an NMOS transistor whose gate is coupled to receive signal DRV3 and whose drain is coupled to the input node) which is controlled by assertion of signal DRV3 from controller chip 31 to its gate; inductor L3 connected between the source of MOS3 and the output node; and Schottky diode D3 connected between ground and the source of MOS2. The buck controller circuitry of FIG. 2 has conventional design, but rotation circuit 30 is provided within controller 31 of FIG. 2 in accordance with the invention.

Controller 31 includes error amplifier 24, having a noninverting input maintained at reference potential $V_{ref}$, ramp generation circuits 20, 21, and 22, comparators 26, 27, and 28, rotation circuit 30, logic circuit and MOSFET driver 36 (which asserts PWM power switch control signal DRV1 to power switch MOS1), logic circuit and MOSFET driver 37 (which asserts PWM power switch control signal DRV2 to power switch MOS2), and logic circuit and MOSFET driver 38 (which asserts PWM power switch control signal DRV3 to power switch MOS3), connected as shown.

Feedback from the converter's output node maintains the noninverting input of amplifier 24 at the converter's output potential $V_{out}$. The output of error amplifier 24, asserted to the noninverting inputs of comparators 26, 27, and 28, is a potential indicative of the difference between the DC-to-DC converter's output potential and the reference potential $V_{ref}$.

Ramp generators 20, 21, and 22 generate ramped voltages RAMP1, RAMP2, and RAMP3. All of voltages RAMP1–RAMP3 have the same frequency (which is 1 MHz in a typical implementation) and their waveforms have the same slope (ramp rate), but they are typically out of phase with respect to each other. Typically, RAMP3 is 120 degrees out of phase with respect to RAMP2, RAMP2 is 120 degrees out of phase with respect to RAMP1, and RAMP1 is 120 degrees out of phase with respect to RAMP3. Each ramped voltage RAMP1, RAMP2, and RAMP3 periodically increases at a fixed ramp rate and then decreases.

Comparators 26, 27, and 28 are identical. Comparator 26 produces a "reset" pulse train T1 in response to a comparison of ramped voltage RAMP1 with the error potential (at amplifier 24's output), comparator 27 produces reset pulse train T2 in response to a comparison of ramped voltage RAMP2 with the error potential, and comparator 28 produces reset pulse train T3 in response to a comparison of ramped voltage RAMP3 with the error potential. Controller 31 thus has three reset channels: one comprising elements 20, 24, and 26; another comprising elements 20, 24, and 27; and a third one comprising elements 20, 24, and 28.

Rotation circuit 30 has three inputs for receiving trains T1–T3, three outputs (R1, R2, and R3) each for asserting a different one of trains T1, T2, and T3, and preferably also inputs for receiving clock signals CLK1, CLK2, and CLK3. Circuit 30 rotates the reset channels relative to the power channels (and control signal channels 36, 37, and 38) so that controller 31 generates PWM switch control signals DRV1–DRV3 in response to a sequence of reset channel states. Using preferred embodiments of circuit 30, the sequence of reset channel states is a periodic sequence in which each reset channel is coupled sequentially to a repeating sequence of the control signal channels (such rotation circuit embodiments can be simply and inexpensively implemented, but in some circumstances could introduce subharmonics into the converter's output voltage ripple due to the repetitive nature of the channel substitution). Using alternative embodiments of circuit 30 (e.g., an embodiment employing a digital random number generator to achieve a random sequence of reset channel states), the sequence of reset channel states is a random sequence (or other non-periodic sequence) in which each reset channel is coupled equally (on a time-averaged basis) to each of control signal channels 36, 37, and 38 (i.e., each control signal channel has equal time-averaged access to each of reset signal trains T1–T3). Such a random (or other non-periodic) sequence of reset channel states would prevent the channel substitutions from introducing subharmonics into the output voltage ripple.

In preferred implementations (e.g., the implementation to be described with reference to FIG. 3), rotation circuit 30 couples the reset channels to the control signal channels in the following repeating sequence: comparators 26, 27, and 28 are coupled respectively to circuits 36, 37, and 38 (so that R1=T1, R2=T2, and R3=T3), then comparators 27, 28, and 26 are coupled respectively to circuits 36, 37, and 38 (so that R1=T2, R2=T3, and R3=T1), and then comparators 28, 26, and 27 are coupled respectively to circuits 36, 37, and 38 (so that R1=T3, R2=T1, and R3=T2).

Circuit 36 (the first control signal channel) includes a latch which is periodically set in response to a clock signal, and which is reset in response to the leading edge of each pulse of train R1 (e.g., each rising edge of pulse train R1). In response to each set signal, circuit 36 causes power switch control signal DRV1 to undergo a transition to a level which turns on switch MOS1, and in response to each reset signal, circuit 36 causes signal DRV1 to undergo a transition to a level which turns off switch Q1. Similarly, circuit 37 (the second control signal channel) includes a latch which is periodically set in response to a clock signal, and which is reset in response to the leading edge of each pulse of train R2, and circuit 38 (the third control signal channel) includes a latch which is periodically set in response to a clock signal, and which is reset in response to the leading edge of each pulse of train R3. In response to each set signal, circuit 37 (38) causes power switch control signal DRV2 (DRV3) to undergo a transition to a level which turns on switch MOS2 (MOS3), and in response to each reset signal, circuit 37 (38) causes signal DRV2 (DRV3) to undergo a transition to a level which turns off switch MOS2 (MOS3).

Figure 3:
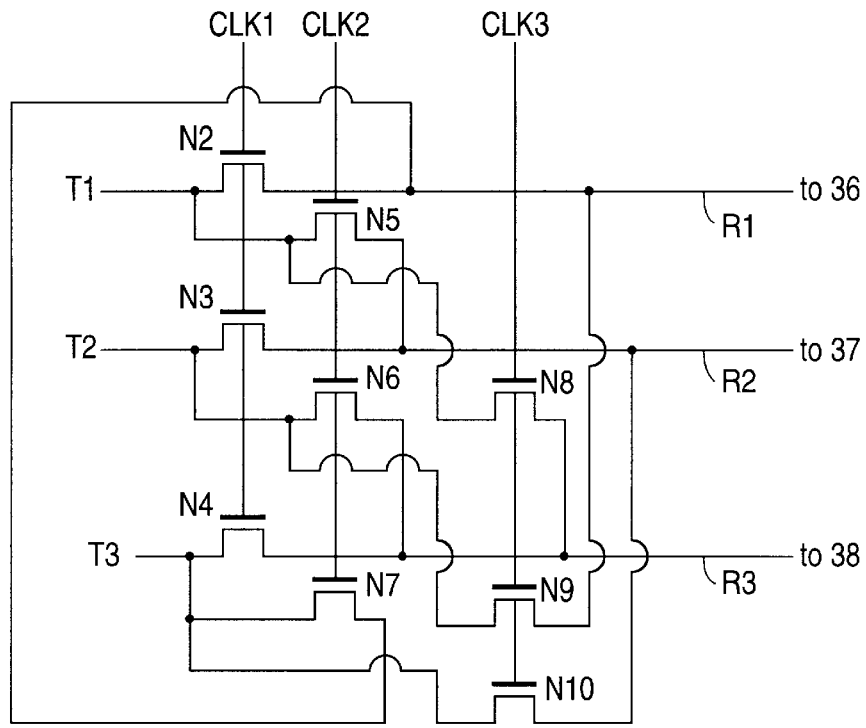
FIG. 3 is a schematic diagram of an implementation of rotation circuit 30 of FIG. 2.
Figure 4:
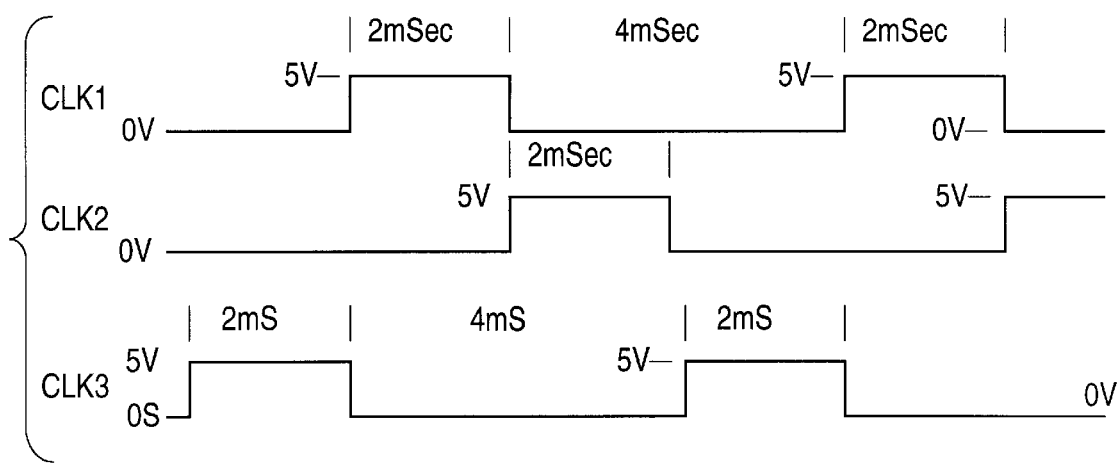
FIG. 4 is a timing diagram of clock signals which control operation of the FIG. 3 circuit.

As shown in FIG. 3, a preferred implementation of rotation circuit 30 is a multiplexer comprising NMOS transistors N2, N3, and N4 having gates coupled to receive clock signal CLK1, NMOS transistors N5, N6, and N7 having gates coupled to receive clock signal CL2, and NMOS transistors N8, N9, and N10 having gates coupled to receive clock signal CLK3. The drains of N2, N5, and N8 are coupled to receive reset pulse train T1, the drains of N3, N6, and N9 are coupled to receive reset pulse train T2, the drains of N4, N7, and N10 are coupled to receive reset pulse train T2, the sources of N2, N7, and N9 are coupled to assert reset pulse train R1 (i.e., to assert one of T1, T2, and T3 as R1), the sources of N3, N5, and N10 are coupled to receive reset pulse train T2, and the sources of N4, N6, and N8 are coupled to assert reset pulse train R3. As shown in FIG. 4, clock signals CLK1, CLK2, and CLK3 which control operation of the FIG. 3 circuit are 120 degrees out of phase with respect to each other. In a typical implementation, each clock has a period of 6 msec, and is high (at 5 volts above ground) for 2 msec of each period. In response to a rising edge of CLK1, transistors N2, N3 and N4 pass trains T1, T2, and T3, respectively, as trains R1, R2, and R3 for the initial third of the period (CLK2 and CLK3 remain low during this initial portion of the clock period). Then, in response to a rising edge of CLK2, transistors N5, N6 and N7 pass trains T1, T2, and T3, respectively, as trains R2, R3, and R1 for the next third of the period (CLK1 and CLK3 remain low during this middle portion of the clock period). Then, in response to a rising edge of CLK3, transistors N8, N9 and N10 pass trains T1, T2, and T3, respectively, as trains R3, R1, and R2 for the final third of the period (CLK1 and CLK3 remain low during this final portion of the clock period).

Figure 5:
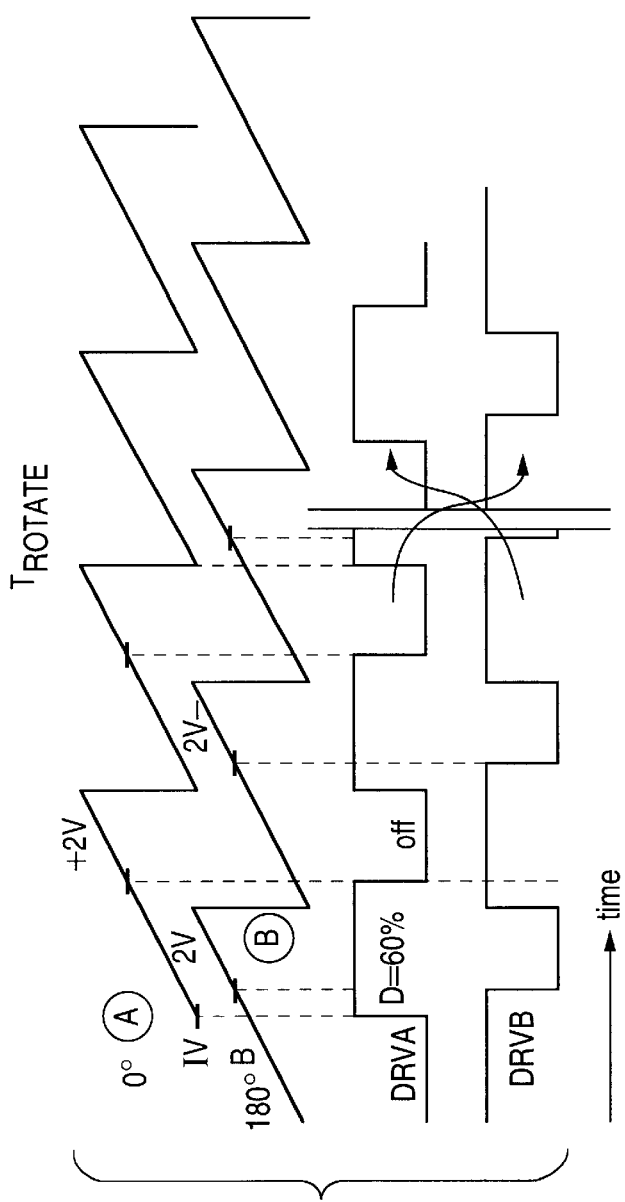
FIG. 5 is a diagram of ramped voltage signals and PWM switch control signals generated in a two-channel embodiment of the inventive controller, illustrating rotation errors resulting from rotation of trigger channels relative to power channels.

FIG. 5 is a diagram of ramped voltage signals and PWM switch control signals generated in a two-channel embodiment of the inventive controller, in which the ramped voltages ("A" and "B") for the two reset channels are 180 degrees out of phase with respect to each other. The rising edges of the switch control signals ("DRVA" and "DRVB") occur periodically (in response to periodic set pulses). The reset pulse trains generated in response to voltages A and B are periodically rotated relative to the power channels (so that first one and then the other of voltages A and B is used to generate each of signals DRVA and DRVB). The rotation period is much longer than the period of voltage A, so that only one rotation event (at time $T_{ROTATE}$) is indicated in FIG. 5. The falling edges of control signal DRVA (or DRVB) occur in response to reset pulses generated each time the relevant ramped voltage (A or B) rises to a level which trips the comparator of the relevant reset channel. A "rotation error" occurs when rotation (substitution of one reset channel for the other) during a power switch cycle causes control signal DRVA (or DRVB) to keep a power switch closed for a longer or shorter time (after the power switch is closed at the start of the power switch cycle) than if the rotation did not occur. For example, at time $T_{ROTATE}$ of FIG. 5, two rotation errors occur: one which causes premature opening of the power switch controlled by DRVA; and another one which delays the opening of the power switch controlled by DRVB. The latter rotation error may cause abnormally high current in the power channel controlled by DRVB (either causing the inductor for that power channel inductor to saturate or requiring use of a larger, more expensive inductor).

In some embodiments of the invention, rotation errors are not significant (e.g., they occur infrequently) and can be tolerated. In other embodiments, rotation errors are prevented.

The time interval between rotations (of "reset" channels or other trigger channels relative to power channels) depends on the heating characteristics of the power switches of the power channels. In typical implementations of the FIG. 2 circuit, in which the PWM duty cycle frequency is on the order of 1 MHz to 10 MHz (so that the period of each of ramped voltages RAMP1, RAMP2, and RAMP3 is on the order of 100 ns to 1000 ns), the time interval between rotations is on the order of 10 ms.

Figure 6:
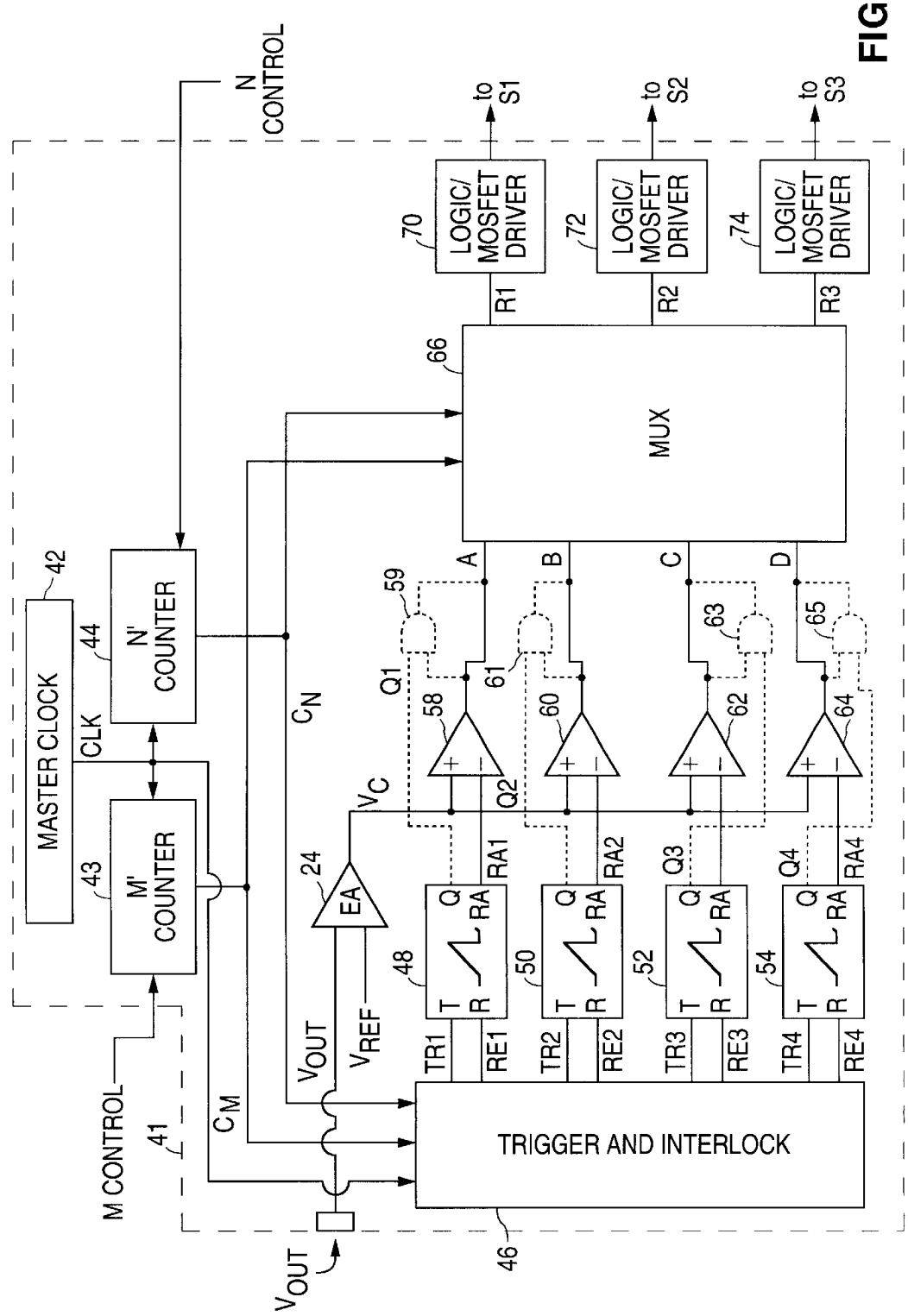
FIG. 6 is a simplified block diagram of a controller (for use with a DC-to-DC converter) designed in accordance with an "extra reset channel" embodiment of the invention.

FIG. 6 is a simplified block diagram of a switching controller (identified by reference number 41) designed in accordance with an "extra reset channel" embodiment of the invention. Controller 41 is intended for use in a DC-to-DC converter having three power delivery channels, each including a different one of power switches (identified as S1, S2, and S3, but not shown) coupled to logic and MOSFET driver circuits 70, 72, and 74, respectively. In typical embodiments, switches S1, S2, and S3 are identical to MOSFET devices MOS1, MOS2, and MOS3 of FIG. 2, and the power channel circuitry external to controller 41 is buck converter circuitry identical to that shown (external to controller 31) in FIG. 2.

In all embodiments, the external power channel circuitry asserts output potential $V_{out}$ at its output node in response to input potential $V_{in}$ at its input node.

Controller 41 includes error amplifier 24 (identical to error amplifier 24 of FIG. 2), having a non-inverting input maintained at reference potential $V_{ref}$, master clock generation circuit 42, counters 43 and 44, ramp trigger generation and interlock circuit 46, ramp generation circuits 48, 50, 52, and 54, comparators 58, 60, 62, and 64, multiplexer (rotation circuit) 66, and logic circuit and MOSFET driver 70 (which asserts a PWM power switch control signal to power switch S1), logic circuit and MOSFET driver 72 (which asserts a PWM power switch control signal to power switch S2), and logic circuit and MOSFET driver 74 (which asserts a PWM power switch control signal to power switch S3), connected as shown.

Each of circuits 70, 72, and 74 implements a switch control signal channel, and each of comparators 58 (with circuit 48), 60 (with circuit 50), 62 (with circuit 52), and 64 (with circuit 54) implements a trigger channel (which can generate a train of trigger signals and assert the train to circuit 66). Controller 41 of FIG. 6 can be modified to include additional trigger channels and/or control signal channels connected in parallel with those shown, or to include three trigger channels and two control signal channels, with the constraint that in each embodiment there are N control signal channels and M trigger channels (each for generating a train of reset signals), where N is an integer greater than one and M is an integer greater than N.

Feedback from the converter's output node maintains the noninverting input of amplifier 24 at the converter's output potential $V_{out}$. The output of error amplifier 24, asserted to the noninverting inputs of comparators 26, 27, and 28, is a potential indicative of the difference between the converter's output potential and the reference potential $V_{ref}$.

Master clock generation circuit 42 generates a clock signal CLK (of the type shown in FIG. 9), with frequency typically on the order of 100 kHz to 10 MHz. The duty cycle of the signal CLK is chosen to determine the desired switch dead-time period (to be described with reference to signal Q1 of FIGS. 6 and 9 and signals Q2–Q4 of FIG. 6).

Figure 9:
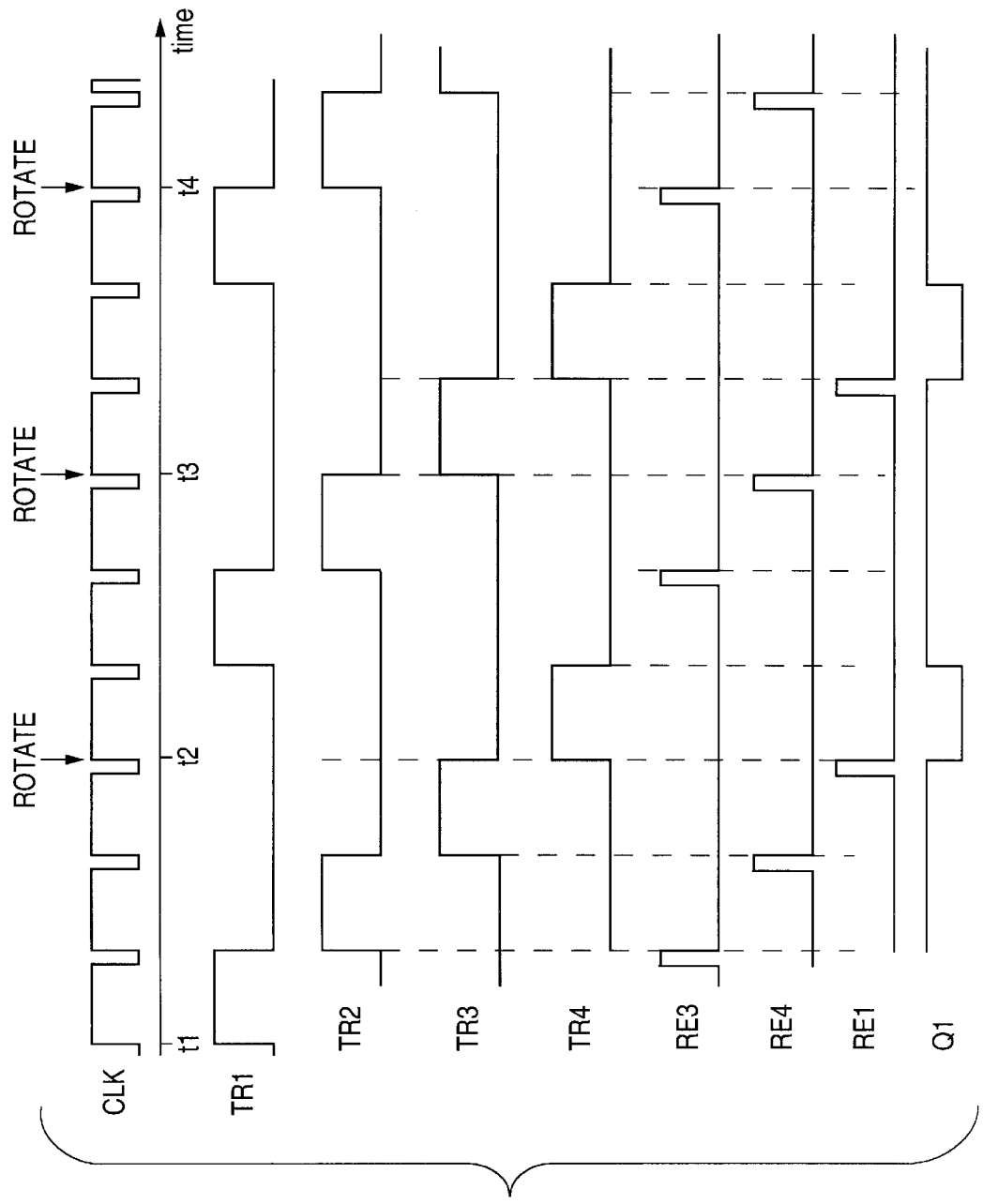
FIG. 9 is a timing diagram of signals generated during operation of the implementation of controller 41 described with reference to FIG. 8.

Counter 44 repetitively counts from 0 to N'−1 (where N' is the number of control signal channels, N'=N=3 in a preferred implementation), to generate count signal $C_N$. Counter 43 repetitively counts from 0 to M'''1 (where M' is the number of trigger channels, M'=M=4, in a preferred implementation), to generate count signal $C_M$. In response to count signals $C_N$ and $C_M$ and clock signal CLK from circuits 42, 43 and 44 (in an implementation in which M'=4 and N'=3), ramp trigger generation and interlock circuit 46 asserts trains TR1, TR2, TR3, and TR4 of ramp trigger pulses (having waveforms as shown in FIG. 9) to circuits 48, 50, 52, and 54, respectively, and rotation reset signals RE1, RE3, RE4 (having waveforms as shown in FIG. 9), and RE2, to circuits 48, 50, 52, and 54, respectively.

In response to the leading edge of each pulse of train TR1, a one shot (not shown) within circuit 48 causes ramp generation circuitry within circuit 48 to generate one cycle of ramped voltage RA1 (i.e., a rising portion of voltage RA1 followed by a falling portion). In response to each leading edge of pulse train TR2, a one shot within circuit 50 causes ramp generation circuitry within circuit 50 to generate one cycle of ramped voltage RA2. In response to each leading edge of pulse train TR3, a one shot within circuit 52 causes ramp generation circuitry within circuit 52 to generate one cycle of ramped voltage RA3. In response to each leading edge of pulse train TR4, a one shot within circuit 54 causes ramp generation circuitry within circuit 54 to generate one cycle of ramped voltage RA4. In preferred implementations, the pulses of trains TR1, TR2, TR3, and TR4 all occur with the same frequency, and the rising portions of the waveforms of all of voltages RA1–RA4 have the same slope (ramp rate), but the rising portions of voltages RA1–RA4 are 90 degrees out of phase with respect to each other (each ramp RAi is 90 degree out of phase with respect to each ramp RAj, where j=i+1). Each ramped voltage RA1, RA2, RA3, and RA4 periodically increases at a fixed ramp rate and then decreases.

Comparators 58, 60, 62, and 64 are identical. Comparator 58 produces a "reset" pulse train A in response to a comparison of ramped voltage RA1 with the error potential (at amplifier 24's output), comparator 60 produces reset pulse train B in response to a comparison of ramped voltage RA2 with the error potential, comparator 62 produces reset pulse train C in response to a comparison of ramped voltage RA3 with the error potential, and comparator 64 produces reset pulse train D in response to a comparison of ramped voltage RA4 with the error potential. Controller 41 thus has four reset channels (also referred to herein as "trigger" channels): one comprising elements 46, 24, 48, and 58; another comprising elements 46, 24, 50, and 60; another comprising elements 46, 24, 52, and 62; and a fourth comprising elements 46, 24, 54, and 64. Alternatively, each pulse train generated by comparators 58, 60, 62, and 64 is a "set" pulse train (rather than a "reset" pulse train), and the invention generates each switch control signal in response to a train of periodic reset signals and a sequence of different ones of the set pulse trains.

Multiplexer 66 operates in response to the count signals $C_M$ and $C_N$, to select (at any instant) three of the pulse trains A, B, C, and D, to couple the three trigger channels (corresponding to the three selected trains) to circuits 70, 72, and 74 with a selected mapping between the trigger channels and circuits 70, 72, and 74. Multiplexer 66 decouples the non-selected trigger channel from circuits 70, 72, and 74. Multiplexer 66 rotates the selected trigger channels relative to circuits 70, 72, and 74 (i.e., to the power channels and control signal channels), so that controller 41 generates switch control signals in response to a sequence of selected trigger channel states.

Each of the selected trigger channel states is determined by a mapping of three of the trigger channels to three different control signal channels. Each of the trigger channel states is determined by a unique one-to-one mapping of the power switch control signals to a set of three of the trigger channels, such that each power switch control signal (asserted to switch S1, S2, or S3) is generated in response to a train of trigger signals from a corresponding one of the trigger channels. Preferably, multiplexer 66 is implemented so that the sequence of trigger channel states is a periodic sequence in which each trigger channel is employed sequentially to generate a repeating sequence of power switch control signals. An example of such implementation of multiplexer 66 will be described with reference to FIG. 7. Alternatively, multiplexer 66 is implemented so that a random (or other non-periodic) sequence of the four trigger channel is employed equally, on a time-average basis, to generate each of the power switch control signals (so that each of circuits 70, 72, and 74 has equal time-averaged access to each trigger channel).

Figure 7:
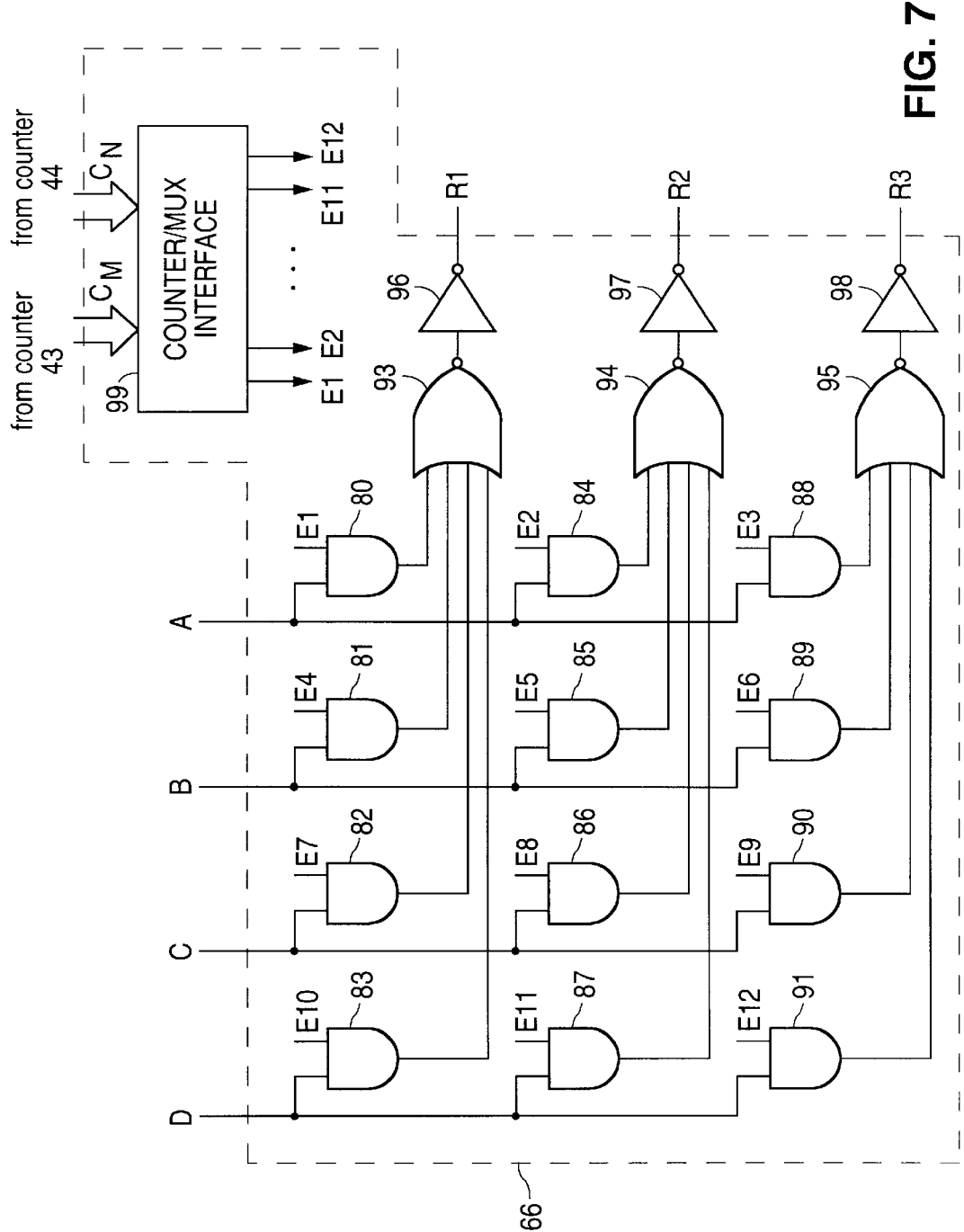
FIG. 7 is a schematic diagram of an implementation of multiplexer circuit 66 of FIG. 6.

In FIGS. 6 and 7, the outputs of multiplexer 66 coupled to circuits 70, 72, and 74 are respectively denoted R1, R2, and R3. In the FIG. 7 implementation of multiplexer 66 (with N'=3 and M'=4), logic circuitry responds to count signals $C_N$ and $C_M$ by causing multiplexer 66 to cycle through the following repeating sequence of trigger channel states: a first state in which trains A, B, and C are coupled to outputs R1, R2, R3, respectively; a second state in which trains D, A, and B are coupled to outputs R1, R2, R3, respectively; a third state in which trains C, D, and A are coupled to outputs R1, R2, R3, respectively; and a fourth state in which trains B, C, and D are coupled to outputs R1, R2, R3, respectively.

In preferred embodiments, signal CN is a word comprising K binary bits and signal $C_M$ is a word comprising L binary bits. The FIG. 7 implementation of multiplexer 66 assumes that counter 44 repetitively counts from 0 to 2 (so that signal $C_N$ comprises two binary bits) and that counter 43 repetitively counts from 0 to 3 (so that signal $C_M$ comprises two binary bits).

In the FIG. 7 implementation of multiplexer 66, logic circuit 99 receives count signals $C_N$ and $C_M$. At each instant, signals $C_N$ and $C_M$ determine a word comprising four binary bits. A repeating sequence of twelve such words is asserted to circuit 99. In response to each four-bit word in the repeating sequence, logic circuit 99 asserts a different set of twelve bits E1–E12.

The FIG. 7 implementation of multiplexer 66 also includes logic circuitry consisting of AND gates 80, 81, 82, 83, 84, 85, 86, 87, 88, 89, 90, and 91, NOR gates 93, 94, and 95, and inverters 96, 97, and 98, connected as shown. A first input of each of AND gates 80–91 receives a different one of bits E1–E12. Reset pulse train A is asserted to a second input of each of AND gates 80, 84, and 88, reset pulse train B is asserted to a second input of each of AND gates 81, 85, and 89, reset pulse train C is asserted to a second input of each of AND gates 82, 86, and 90, and reset pulse train D is asserted to a second input of each of AND gates 83, 87, and 91. The outputs of inverters 96, 97, and 98 are outputs R1, R2, and R3, respectively. In response to the repeating sequence of bit sets E1–E12, multiplexer 66 is in a first state (during a first repetition of counter 44's count from N'=0 to N'=2) in which trains A, B, and C are coupled to outputs R1, R2, R3, respectively; a second state (during the next repetition of counter 44's count) in which trains D, A, and B are coupled to outputs R1, R2, R3, respectively; a third state (during the next repetition of counter 44's count) in which trains C, D, and A are coupled to outputs R1, R2, R3, respectively; a fourth state (during the next repetition of counter 44's count) in which trains B, C, and D are coupled to outputs R1, R2, R3, respectively; and then the first state (during the next repetition of counter 44's count), and so on in repeating fashion.

An implementation of controller 41 (to be described in greater detail below with reference to FIGS. 8 and 9) employs signals RE1–RE4, and includes AND gates 59, 61, 63, and 65 (shown in phantom view in FIG. 6), to prevent duty-cycles of 100%. 100% duty-cycle operation is undesirable in boost, inverting, transformer-coupled and overwinding buck circuit implementations where energy is transferred to an output in the second part of each cycle. In this implementation of controller 41, the outputs of comparators 58, 60, 62, and 64 are asserted to first inputs of AND gates 59, 61, 63, and 65 (rather than directly to multiplexer 66), and each of circuits 48, 50, 52, and 54 has an output (labeled Q in FIG. 6) coupled to the second input of a corresponding one of AND gates 59, 61, 63, and 65 (i.e., output Q of circuit 48 is coupled to the second input of AND gate 59, output Q of circuit 50 is coupled to the second input of AND gate 61, and so on). Each of circuits 48, 50, 52, and 54 is configured (in a manner to be described with reference to FIG. 8) to assert a signal (Qi) from its output Q to the corresponding one of AND gates 59, 61, 63, and 65, so as to force the output of the corresponding one of AND gates 59, 61, 63, and 65 to a level that triggers a latch reset in the corresponding one of circuits 70, 72, and 74 at appropriate times, regardless of the level of the output of the corresponding one of comparators 58, 60, 62, 64. The function of AND gates 59, 61, 63, and 65 and the logic circuitry within circuits 48, 50, 52, and 54 for generating signals Qi is to prevent operation with 100% duty cycle which would cause power transfer problems in boost, inverting and transformer coupled circuits.

Figure 8:
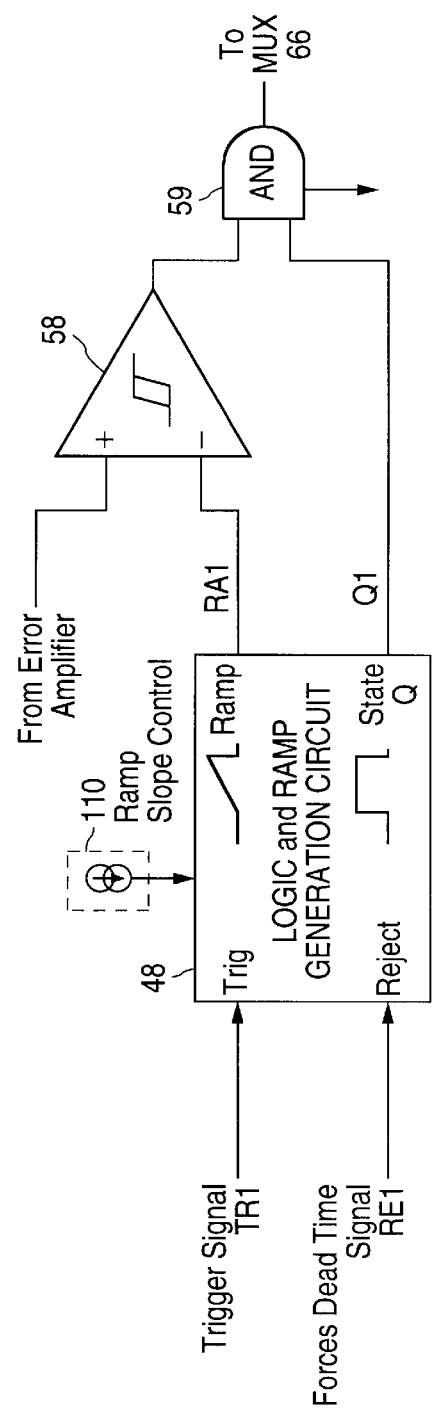
FIG. 8 is a block diagram of elements 48, 58, and 59 (or elements 50, 60, and 61, or 52, 62, and 63, or 54, 64, and 65) for use in an implementation of controller 41 of FIG. 6.

FIG. 8 is a block diagram of elements 48, 58, and 59, which are used in an implementation of controller 41 of FIG. 6 (mentioned above) in which AND gates 59, 61, 63, and 65 are connected between multiplexer 66 and the outputs of comparators 58, 60, 62, and 64. FIG. 9 is a timing diagram of signals generated during operation of such implementation of controller 41. In this implementation of controller 41, circuits 48, 50, 52, and 62 are identical, and thus the FIG. 8 circuitry is also employed to implement any of trigger channel circuitry 50, 60, and 61, trigger channel circuitry 52, 62, and 63, and trigger channel circuitry 54, 64, and 65.

Ramp generation circuit 48 of FIG. 8 includes a one shot circuit coupled to receive train TR1 of ramp trigger pulses (at the input of circuit 48 labeled "Trig") and ramp generation circuitry coupled to the one shot circuit. In response to the leading edge of each pulse of train TR1, the one shot causes the ramp generation circuitry to generate one cycle of ramped voltage RA1 (one rising portion followed by a falling portion). In preferred implementations, the pulses of trains TR1, TR2, TR3, and TR4 all occur with the same frequency. Ramp generation circuit 48 also includes additional one shot circuitry coupled to receive signal RE1 (at the input of circuit 48 labeled "Reset") and configured to assert signal Q1 (at the output of circuit 48 labeled "Q") in response to signal RE 1. Specifically, in response to each rising edge of signal RE1, the additional one shot circuitry asserts a low-going pulse of signal Q1 (as shown in FIG. 9). Optionally, the ramp generation circuitry within circuit 48 is coupled to receive a control signal from a ramp slope control circuit (circuit 110 shown in FIG. 8), and configured vary the slope of the rising portion of each cycle of ramped voltage RA1 in response to such control signal.

The pulses of each of signals RE1, RE2, RE3, and RE4 occur 90 degrees out of phase with respect to each other. Thus, the FIG. 8 implementation of ramp generation circuit 50 would assert signal Q2 with low-going pulses that are 90 degrees out of phase with respect to the low-going pulses of signal Q1, the FIG. 8 implementation of ramp generation circuit 52 would assert signal Q3 with low-going pulses that are 180 degrees out of phase with respect to the lowgoing pulses of signal Q1, and the FIG. 8 implementation of ramp generation circuit 54 would assert signal Q4 with low-going pulses that are 270 degrees out of phase with respect to the low-going pulses of signal Q1.

As apparent from FIG. 9, multiplexer 66 of the described implementation rotates the trigger channels with a frequency equal to one third of the frequency of the CLK signal (at times coinciding with returns to zero of count signal $C_N$ asserted by counter 44). Thus, if circuit operation commences at time t1, multiplexer 66 rotates the trigger channels at times t2, t3, and t4.

The rotation error is prevented by sequentially rotating out the trigger channels and allowing each to recover to an initial/idle state before rotating it back in. Thus, an extra trigger channel is needed to take the idled channels place until it recovers to the initial state. Without this scheme, one is forced to swap a trigger channel with one that is still in the process of experiencing the ramped voltage in preparation for generating a reset signal. The consequence of swapping with the active channel is a glitch in the switch waveforms called a "rotation error".

With reference to FIGS. 8 and 9, ramped voltage RAI begins to rise in response to each rising edge of signal TR1. Following time t1, the output of comparator 58 may or may not undergo a high-to-low transition prior to the rotation at time t2. In order to prevent 100% duty cycle at time t2, during substitution (at circuit 72) of the output of comparator 58 for the output of comparator 60, signal RE1 causes signal Q1 to undergo a high-to-low transition during the low portion of the master clock immediately before time t2. In response to the low level of signal Q1 commencing at time t2 (the "dead time" of signal Q1), the output of AND gate 59 is low, which forces a reset of the latch within circuit 72 (at time t2). This forces a "dead time" (commencing at time t2) in signal train A (which multiplexer 66 couples to circuit 72 at time t2), and is equivalent to forcing the output of comparator 58 to undergo a high-to-low transition at time t2 (which would also cause a reset of the latch within circuit 72 at time t2).

Similarly, the output of AND gate 65 is low in response to a low level of signal Q4 at time t3 (the next rotation time) to prevent 100% duty cycle at time t3 during substitution of the output of comparator 64 for the output of comparator 58, the output of AND gate 63 is low in response to a low level of signal Q3 at time t4 (the next rotation time) to prevent 100% duty cycle at time t4 during substitution of the output of comparator 62 for the output of comparator 64, and the output of AND gate 61 is low in response to a low level of signal Q2 at the rotation time which follows t4 to prevent 100% duty cycle (at that rotation time) during substitution of the output of comparator 60 for the output of comparator 62.

Figure 10:
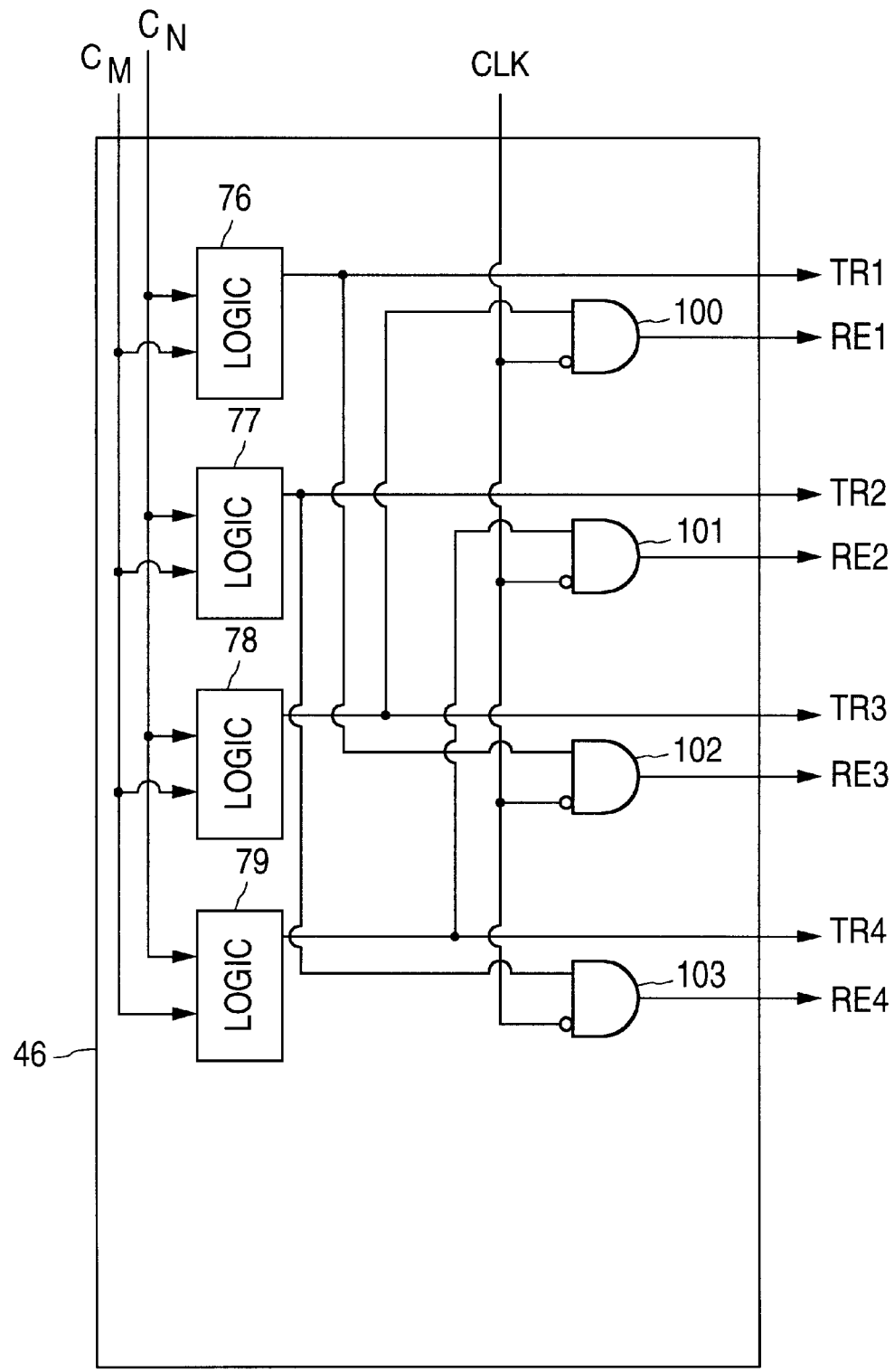
FIG. 10 is a block diagram of trigger and interlock circuit 46 of the implementation of controller 41 described with reference to FIG. 8.

FIG. 10 is a block diagram of trigger and interlock circuit 46 of the implementation of controller 41 (of FIG. 6) which has been described with reference to FIGS. 8 and 9. In the FIG. 10 implementation of circuit 46, logic circuitry 76 is configured to generates signal TR1, logic circuitry 77 is configured to generate signal TR2, logic circuitry 78 is configured to generate signal TR3, and logic circuitry 79 is configured to generate signal TR4, each in response to count signals $C_N$ and $C_M$. A first input of each of AND gates 100, 101, 102, and 103 is coupled to receive the inverse of the clock signal CLK, a second input of AND gate 100 is coupled to receive signal TR3, a second input of AND gate 101 is coupled to receive signal TR4, a second input of AND gate 102 is coupled to receive signal TRI, and a second input of AND gate 103 is coupled to receive signal TR2. Signals RE1, RE2, RE3, and RE4 are the outputs of AND gates 100, 101, 102, and 103, respectively.

In some implementations of the circuit of FIG. 6, each of counters 43 and 44 is configured to operate in any selected one of multiple operating modes (in response to external controls signals MCONTROL and NCONTROL shown in FIG. 6), with counters 43 and 44 counting to different maximum values in their different modes. For example (for a DC-to-DC converter having only two paralleled power channels), to disable the fourth trigger channel (comprising elements 54 and 64) and third control signal channel (circuit 74), control signal MCONTROL would cause counter 43 to repetitively counts from zero to three, and control signal NCONTROL would cause counter 44 to repetitively count from zero to two. In such operating mode, the controller would rotate three trigger channels relative to two control signal channels, in order to control a DC-to-DC converter having two power channels with two power switch control signals (output from circuits 70 and 72) that are 180 degrees out of phase with respect to each other.

In implementations in which the number of trigger channels and control signal channels are controllable, it is desirable for the controller to be capable of controlling the slope of the rising portions of each ramped voltage employed in the trigger channels. Thus, if the fourth trigger channel and third control signal channel of controller 41 of FIG. 6 are disabled, it is desirable for ramped voltages RA1, RA2, and RA3 to have rising portions with greater slope than do the rising portions of ramped voltages RA1, RA2, RA3, and RA4 when all four trigger channels and all three control signal channels are enabled (so that the ramped voltages RA1–RA3 approach their maximum values by the end of each dead-time interval defined by signals Q1–Q3, even when the fourth trigger channel is disabled and multiplexer 66 rotates the three enabled channels with shorter rotation period than when all four trigger channels are rotated).

Figure 11:
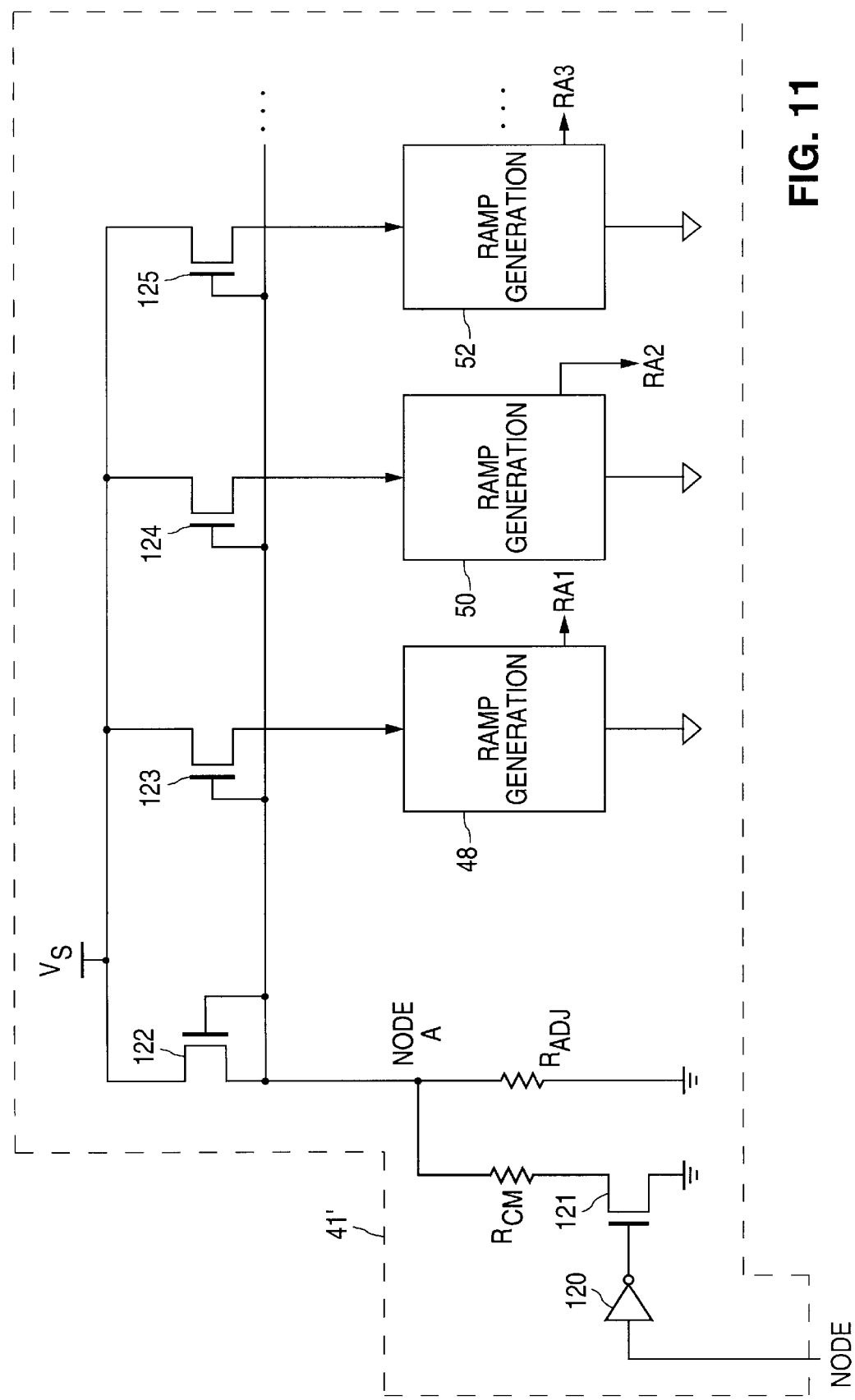
FIG. 11 is a simplified schematic diagram of a portion of an alternative embodiment of the inventive controller with an external ramp slope adjustment resistor.

FIG. 11 is a simplified schematic diagram of a portion of an alternative embodiment of the inventive controller (controller 41') connected as shown to an internal ramp slope adjustment resistor (RADJ). Controller 41' of FIG. 11 differs from controller 41 of FIG. 6 in that it includes ramp slope control circuitry for use in varying the slope of the rising portion of each cycle of each of ramped voltages RA1, RA2, and RA3 generated by ramp generation circuits 48, 50, and 52 (which are preferably identical to circuits 48, 50, and 52 of controller 41). The ramp slope control circuitry includes inverter 120 (whose input is coupled to receive an external mode control signal "Mode"), NMOS transistor 121 (whose gate is coupled to the output of inverter 120), resistor $R_{CM}$ coupled between the channel of NMOS 121 and Node A, and NMOS transistors 122, 123, 124, and 125 having gates coupled to Node A. Transistors 122–125 form a multi-output current mirror. Transistor 122 is the master and the current set through it by $R_{ADJ}$ is copied by the slave transistors 123–125. These cloned currents are then used for ramp control in the ramp-generation circuits. The channel of device 122 is connected between the top rail (at supply potential $V_s$) and Node A, and the channels of devices 123, 124, and 125 are connected between the top rail and the ramp generation circuitry within circuits 48, 50, and 52, respectively. Resistor $R_{ADJ}$ (internal to controller 41') is connected between Node A and ground. In a mode of operation in which all trigger channels of controller 41' (including the fourth trigger channel not shown in FIG. 11) are enabled, the Mode signal has a level which causes inverter 120 to turn off transistor 121, causing the current through Node A to be at a level causing each of devices 122–125 to conduct a first channel current. In response to the first channel current, the rising portions of ramped voltages RA1, RA2, and RA3 have a first slope.

In another mode of operation in which only three trigger channels of controller 41' (those including circuits 48, 50, and 52) are enabled, the Mode signal has another level which causes inverter 120 to turn on transistor 121, which causes the current through Node A to rise to a level causing each of devices 122–125 to conduct a second channel current. In response to the second channel current, the rising portions of ramped voltages RA1, RA2, and RA3 have a second slope (different from the first slope). The potential at Node A (in at least one of the operating modes) can be controlled by replacing resistor $R_{ADJ}$ with another resistor having different resistance.

In variations on any of the embodiments described herein, latch set signals are generated in place of the described "reset" signals and latch reset signals are generated in place of the described "set" signals. In such embodiments, each trigger channel (corresponding to one of the described reset channels) generate a train of latch set signals in response to comparison of a ramped voltage with a feedback signal indicative of the output potential of a DC-to-DC converter. In each control signal channel, a latch is set in response to the latch signals of one such train, and the latch is periodically reset in response to a train of periodically occurring latch reset signals. There can be fewer control signal channels than trigger channels (in "extra trigger channel" embodiments) or there can be one trigger channel for each control signal channel.

In one implementation of FIG. 6, the trigger signals at A, B, C and D are raw switch drive signals that are further conditioned by the logic/MOSFET drivers 70, 72 and 74 (which, in this case, are not latches). This contrasts with the described implementations in which the trigger signals are RESET or SET signals with corresponding SET or RESET signals sent directly to the logic/MOSFET drivers/latches by the clock. In embodiments in which the trigger signals are raw switch drive signals (rather than the described "reset" signals), each trigger channel generates a train of raw switch drive signals in response to comparison of a ramped voltage with a feedback signal indicative of the output potential of a DC-to-DC converter. In each control signal channel, the raw switch drive signal is conditioned by generating a finished signal with the correct voltages for driving the switch, adding drive signals for synchronous rectification or signals for preventing shoot-through between the switch and synchronous rectifier. There can be fewer control signal channels than trigger channels (in "extra trigger channel" embodiments) or there can be one trigger channel for each control signal channel.

Although only preferred embodiments have been described in detail herein, those having ordinary skill in the art will certainly understand that many modifications and variations thereon are possible without departing from the teachings hereof. For example, a wide variety of DC-to-DC converters which employ circuitry, other than buck converter circuitry, external to a switching controller can be implemented in accordance with the invention (in one class of such DC-to-DC converters, boost converter circuitry external to a switching controller chip is employed, the boost converter circuitry provides voltage signals indicative of the individual channel currents to the controller chip, and the controller chip is implemented in accordance with the invention). In another class of DC-DC converter implementations, inverting circuitry external to a switching controller chip is employed. In another class of DC-DC converter implementations, transformers, coupled inductors or uncoupled inductors are employed in the circuitry external to the switching controller chip. In some classes of implementations, the switch, diode or synchronous rectifier is included with the control circuitry on the chip. All such modifications and variations are intended to be encompassed within the following claims.

What is claimed is:

1. A DC-to-DC converter having an output node at which the converter asserts an output potential, said converter comprising:

a switching controller having N control signal channels, where N is an integer greater than one, and multiple trigger signal channels, wherein each of the control signal channels is configured to generate a different one of N pulse width modulated switch control signals, and each of the trigger signal channels is configured to generate a different one of a set of trains of trigger signals in response to comparison of a ramped voltage with a feedback signal indicative of the output potential; and a set of N power delivery channels coupled to the output node, each of the power delivery channels including a power switch coupled to the controller to receive a different one of the switch control signals, wherein the controller includes rotation circuitry coupled to the trigger signal channels and the control signal channels and configured to rotate the trigger signal channels relative to the control signal channels to cause the controller to generate the switch control signals in response to a sequence of trigger channel states, wherein each of the trigger channel states is determined by a mapping each of the control signal channels to a different one of the trigger signal channels.

2. The DC-to-DC converter of claim 1, wherein the trigger signals are reset signals, and each of the control signal channels is configured to generate one of the switch control signals in response to a train of periodic set signals and a sequence of different ones of the trains of trigger signals.

3. The DC-to-DC converter of claim 1, wherein the controller includes N of the trigger signal channels, each of the trigger channel states is determined by a different one-to-one mapping of the trigger signal channels to the control signal channels, and each of the control signal channels is configured to generate one of the switch control signals in response to a sequence of different ones of the trains of trigger signals.

4. The DC-to-DC converter of claim 3, wherein the trigger signals are reset signals, and each of the control signal channels is configured to generate one of the switch control signals in response to a train of periodic set signals and a sequence of different ones of the trains of trigger signals.

5. The DC-to-DC converter of claim 3, wherein the trigger signals are raw switch control signals, and each of the control signal channels is configured to generate one of the switch control signals in response to a sequence of different ones of the trains of trigger signals.

6. The DC-to-DC converter of claim 1, wherein the trigger signals are raw switch control signals, and each of the control signal channels is configured to generate one of the switch control signals in response to a sequence of different ones of the trains of trigger signals.

7. The DC-to-DC converter of claim 1, wherein the controller includes M of the trigger signal channels, where M is an integer greater than N, and each of the trigger channel states is determined by a set of N of the trigger signal channels and a mapping of each of the control signal channels to a different one of the trigger signal channels in said set.

8. The DC-to-DC converter of claim 7, wherein the rotation circuitry comprises a logic gate array coupled between the trigger signal channels and the control signal channels, the logic gate array being configured to pass any selected one of the trains of trigger signals to any selected one of the control signal channels.

9. The DC-to-DC converter of claim 7, wherein the sequence of trigger channel states is a periodic sequence.

10. The DC-to-DC converter of claim 7, wherein the sequence of trigger channel states is a non-periodic sequence in which each of the control signal channels has equal time-averaged access to each of the trigger channels.

11. The DC-to-DC converter of claim 7, wherein M=N+1.

12. The DC-to-DC converter of claim 7, wherein the trigger signal channels include 100% duty cycle prevention circuitry configured to introduce dead times in the trains of trigger signals so as to prevent 100% duty cycle operation which would otherwise delay opening of the power switch of any of the power delivery channels.

13. The DC-to-DC converter of claim 12, wherein each of the trigger signal channels includes a comparator coupled and configured to generate a raw trigger signal train in response to comparison of one said feedback signal with one said ramped voltage, so that the trigger signal channels generate raw trigger signal trains, and the 100% duty cycle prevention circuitry includes logic circuitry configured to generate each of the trains of trigger signals in response to a different one of the raw trigger signal trains by introducing a dead time sequence in each of the raw trigger signal trains.

14. The DC-to-DC converter of claim 1, wherein the switching controller is implemented as an integrated circuit, and the power delivery channels are external to said integrated circuit.

15. The DC-to-DC converter of claim 1, wherein the switching controller is implemented as a portion of an integrated circuit.

16. The DC-to-DC converter of claim 1, wherein the sequence of trigger channel states is a periodic sequence.

17. The DC-to-DC converter of claim 16, wherein N=3, the trigger channels comprise a first trigger channel, a second trigger channel, and a third trigger channel, the control signal channels comprise a first control signal channel, a second control signal channel, and a third control signal channel, and the rotation circuitry is configured to connect the trigger channels to the control signal channels in a repeating sequence in which the first, second, and third trigger channels are connected respectively to the first, second, and third control signal channels, then the second, third, and first trigger channels are connected respectively to the first, second, and third control signal channels, and then the third, first, and second trigger channels are connected respectively to the first, second, and third control signal channels.

18. The DC-to-DC converter of claim 1, wherein the sequence of trigger channel states is a non-periodic sequence.

19. The DC-to-DC converter of claim 1, wherein each time interval between consecutive rotations of the trigger signal channels relative to the control signal channels is sufficiently short to reduce to acceptable levels any differences between time-averaged duty cycles of the power delivery channels.

20. The DC-to-DC converter of claim 1, wherein each said power switch has a steady-state temperature, and wherein time intervals between consecutive rotations of the trigger signal channels relative to the control signal channels are sufficiently short to maintain the steady-state temperature of each said power switch at a substantially constant system temperature.

21. The DC-to-DC converter of claim 1, wherein
time intervals between consecutive rotations of the trigger signal channels relative to the control signal channels are sufficiently long to avoid significant problems due to rotation errors that delay opening of any said power switch.

22. The DC-to-DC converter of claim 1, wherein the trigger signal channels include 100% duty-cycle prevention circuitry configured to introduce dead times in the trains of trigger signals so as to prevent 100% duty cycle operation which would otherwise delay opening of the power switch of any of the power delivery channels.

23. The DC-to-DC converter of claim 22, wherein
each of the trigger signal channels includes a comparator coupled and configured to generate a raw trigger signal train in response to comparison of one said feedback signal with one said ramped voltage, so that the trigger signal channels generate raw trigger signal trains, and the 100% duty cycle prevention circuitry includes logic circuitry configured to generate each of the trains of trigger signals in response to a different one of the raw trigger signal trains by introducing a dead time sequence in each of the raw trigger signal trains.

24. The DC-to-DC converter of claim 1, wherein the controller includes at least one counter configured to generate at least one count signal, and each of the trigger signal channels includes a comparator which generates a trigger signal train in response to comparison of one said ramped voltage and one said feedback signal, wherein the controller also includes:
logic circuitry configured to generate periodically occurring ramp control signals in response to the at least one count signal; and
ramp signal generation circuitry configured to generate each said ramped voltage in response to a different subset of the ramp control signals.

25. The DC-to-DC converter of claim 24, wherein the at least one counter is configured to operate in any selected one of at least two modes, said at least one counter generates trigger channel count signal having a first period in a first one of the modes and a second period in a second one of the modes, the ramp control signals generated in the first one of the modes in response to the trigger channel count signal disable at least one of the trigger signal channels, and the ramp control signals generated in the second one of the modes in response to the trigger channel count signal enable said at least one of the trigger signal channels.

26. A switching controller for use in a DC-to-DC converter having an output node at which an output potential is asserted, wherein the converter has N power delivery channels each including a power switch for coupling to the controller for receiving a different one of N pulse width modulated power switch control signals, and N is an integer greater than one, said controller comprising:
counter circuitry configured to generate at least one count signal;
logic circuitry coupled to the counter circuitry and configured to generate trains of periodically occurring ramp control signals in response to the at least one count signal;
multiple trigger signal channels, comprising ramp signal generation circuitry coupled to the logic circuitry and configured to generate ramped voltages in response to the trains of periodically occurring ramp control signals, wherein each of the trigger signal channels is configured to generate a different one of a set of trigger signal trains, and said each of the trigger signal channels includes a comparator configured to generate a trigger signal train in response to comparison of one of the ramped voltages with a feedback signal indicative of the output potential; and
a set of N control signal channels configured to generate the pulse width modulated switch control signals in response to the trigger signal trains.

27. The controller of claim 26, wherein each of the control signal channels is configured to generate one of the pulse width modulated switch control signals in response to a rotating sequence of the trains of trigger signals, and wherein the controller includes rotation circuitry coupled and configured to assert one said rotating sequence of the trains of trigger signals to each of the control signal channels.

28. A switching controller, for use in a DC-to-DC converter having an output node at which an output potential is asserted, wherein the converter has N power delivery channels each including a power switch for coupling to the controller for receiving a different one of N pulse width modulated power switch control signals, and N is an integer greater than one, said controller comprising:
a set of N control signal channels, each configured to generate a different one of the pulse width modulated switch control signals;
multiple trigger signal channels, each configured to generate a different one of a set of trigger signal trains in response to comparison of a ramped voltage with a feedback signal indicative of the output potential; and rotation circuitry coupled to the trigger signal channels and the control signal channels and configured to rotate the trigger signal channels relative to the control signal channels to cause the controller to generate the switch control signals in response to a sequence of trigger channel states, wherein each of the trigger channel states is determined by a mapping each of the control signal channels to a different one of the trigger signal channels.

29. The controller of claim 28, wherein the trigger signals are reset signals, and each of the control signal channels is configured to generate one of the switch control signals in response to a train of periodic set signals and a sequence of different ones of the trigger signal trains.

30. The controller of claim 28, wherein the trigger signals are set signals, and each of the control signal channels is configured to generate one of the switch control signals in response to a train of periodic reset signals and a sequence of different ones of the trigger signal trains.

31. The controller of claim 28, wherein the trigger signals are raw switch control signals, and each of the control signal channels is configured to generate one of the switch control signals in response to a sequence of different ones of the trigger signal trains.

32. The controller of claim 28, wherein said controller includes N of the trigger signal channels, each of the trigger channel states is determined by a different one-to-one mapping of the trigger signal channels to the control signal channels, and each of the control signal channels is configured to generate one of the switch control signals in response to a sequence of different ones of the trigger signal trains.

33. The controller of claim 32, wherein the trigger signals are reset signals, and each of the control signal channels is configured to generate one of the switch control signals in response to a train of periodic set signals and a sequence of different ones of the trigger signal trains.

34. The controller of claim 32, wherein the trigger signals are set signals, and each of the control signal channels is configured to generate one of the switch control signals in response to a train of periodic reset signals and a sequence of different ones of the trigger signal trains.

35. The controller of claim 32, wherein the trigger signals are raw switch signals, and each of the control signal channels is configured to generate one of the switch control signals in response to a sequence of different ones of the trigger signal trains.

36. The controller of claim 28, wherein the sequence of trigger channel states is a periodic sequence.

37. The controller of claim 28, wherein the sequence of trigger channel states is a non-periodic sequence in which each of the control signal channels has equal time-averaged access to each of the trigger channels.

38. The controller of claim 28, wherein said controller includes M of the trigger signal channels, where M is an integer greater than N, and each of the trigger channel states is determined by a set of N of the trigger signal channels and a mapping of each of the control signal channels to a different one of the trigger signal channels in said set.

39. The controller of claim 38, wherein the rotation circuitry comprises a logic gate array coupled between the trigger signal channels and the control signal channels, and the logic gate array is configured to pass any selected one of the trigger signal trains to any selected one of the control signal channels.

40. The controller of claim 39, wherein the rotation circuitry comprises one of an analog switch, multiplexer, and crosspoint switch coupled between the trigger signal channels and the control signal channels, and said one of the analog switch, multiplexer, and crosspoint switch is configured to pass any selected one of the trigger signal trains to any selected one of the control signal channels.

41. The controller of claim 38, wherein M is not less than N+1.

42. The controller of claim 38, wherein the trigger signal channels include 100% duty cycle prevention circuitry configured to force dead times in the trigger signal trains so as to prevent 100% duty cycle which would otherwise delay opening of the power switch of any of the power delivery channels.

43. The controller of claim 42, wherein each of the trigger signal channels includes a comparator coupled and configured to generate a raw trigger signal train in response to comparison of said feedback signal with one said ramped voltage, so that the trigger signal channels generate raw trigger signal trains, and wherein the 100% duty cycle prevention circuitry includes logic circuitry configured to generate each of the trigger signal trains in response to a different one of the raw trigger signal trains by introducing a dead time sequence in each of the raw trigger signal trains.

44. The controller of claim 28, wherein said controller is implemented as an integrated circuit, and the power delivery channels are external to said integrated circuit.

45. The controller of claim 28, wherein each time interval between consecutive rotations of the trigger signal channels relative to the control signal channels is sufficiently short to reduce to acceptable levels any differences between time-averaged duty cycles of the power delivery channels.

46. The controller of claim 28, wherein each said power switch has a steady-state temperature, and wherein time intervals between consecutive rotations of the trigger signal channels relative to the control signal channels are sufficiently short to maintain the steady-state temperature of each said power switch at a substantially constant system temperature.

47. The controller of claim 28, wherein time intervals between consecutive rotations of the trigger signal channels relative to the control signal channels are sufficiently long to avoid significant problems due to rotation errors that delay opening of any said power switch.

48. The controller of claim 28, wherein the trigger signal channels include 100% duty cycle prevention circuitry configured to introduce dead times in the trigger signal trains so as to prevent 100% duty cycle which would otherwise delay opening of the power switch of any of the power delivery channels.

49. The controller of claim 48, wherein each of the trigger signal channels includes a comparator coupled and configured to generate a raw trigger signal train in response to comparison of said feedback signal with one said ramped voltage, so that the trigger signal channels generate raw trigger signal trains, and wherein the 100% duty cycle prevention circuitry includes logic circuitry configured to generate each of the trigger signal trains in response to a different one of the raw trigger signal trains by introducing a dead time sequence in each of the raw trigger signal trains.

50. A method for performing DC-to-DC conversion using a DC-to-DC converter having N power channels connected between an output node, at which the converter asserts an output potential, and an input node, wherein N is an integer greater than one, and each of the power channels includes a power switch configured to operate under control of a pulse width modulated switch control signal, said method comprising the steps of:

(a) employing multiple trigger signal channels to generate trigger signal trains, wherein each of the trigger signal trains is generated in response to comparison of a ramped voltage with a signal indicative of the output potential;

(b) generating N pulse-width modulated switch control signals in response to a sequence of trigger channel states, wherein each of the trigger signal states is determined by a unique one-to-one mapping of the switch control signals to a set of N of the trigger signal channels, wherein each of the switch control signals is generated in response to a sequence of different ones of the trigger signal trains; and (c) sequentially asserting N of the trigger signals to each of the N switch control channels, wherein the one-to-one mapping of the switch control channels to the trigger channels changes over time, such that the trigger channels rotate between the switch control channels.

51. The method of claim 50, wherein the sequence of trigger channel states is a periodic sequence.

52. The method of claim 50, wherein the sequence of trigger channel states is a non-periodic sequence.

53. The method of claim 50, wherein the trigger signals are reset signals.

54. The method of claim 50, wherein the trigger signals are set signals.

55. The method of claim 50, wherein the trigger signals are raw switch control signals.

56. The method of claim 50, wherein step (a) includes the step of enabling subsets of a set of M of the trigger signal channels, where M is an integer greater than N, and each of the subsets comprises N enabled ones of the trigger signal channels, and causing each of the subsets of enabled ones of the trigger signal channels to generate a set of N of the trigger signal trains.

57. The method of claim 50, wherein step (b) includes the step of operating a logic gate array to pass a sequence of selected ones of the trigger signal trains to each of the control signal channels.

58. A method for generating pulse width modulated switch control signals for use in a DC-to-DC converter having N power channels and configured to assert an output potential at an output node under control of the switch control signals, where N is an integer greater than one, and each of the power channels includes a power switch for receiving a different one of the switch control signals, said method comprising the steps of:

(a) employing multiple trigger signal channels to generate trigger signal trains, wherein each of the trigger signal trains is generated in response to comparison of a ramped voltage with a signal indicative of the output potential; and (b) generating N of the switch control signals in response to a sequence of trigger channel states, wherein each of the trigger signal states is determined by a unique one-to-one mapping of the switch control signals to a set of N of the trigger signal channels, wherein each of the switch control signals is generated in response to a sequence of different ones of the trigger signal trains.

59. The method of claim 58, wherein the sequence of trigger channel states is a periodic sequence.

60. The method of claim 58, wherein the sequence of trigger channel states is a non-periodic sequence in which each of the control signal channels has equal time-averaged access to each of the trigger channels.

61. The method of claim 58, wherein step (a) includes the step of enabling subsets of a set of M of the trigger signal channels, where M is an integer greater than N, and each of the subsets comprises N enabled ones of the trigger signal channels, and causing each of the subsets of enabled ones of the trigger signal channels to generate a set of N of the trigger signal trains.

62. The method of claim 58, wherein step (b) includes the step of operating a logic gate array to pass a sequence of selected ones of the trigger signal trains to each of the control signal channels.

63. The method of claim 58, wherein step (b) includes the step of operating an array of analog switches, MUXes or crosspoint switches to pass a sequence of selected ones of the trigger signal trains to each of the control signal channels.

64. A method for generating pulse width modulated switch control signals for use in a DC-to-DC converter having N power channels and configured to assert an output potential at an output node under control of the switch control signals, where N is an integer greater than one, and each of the power channels includes a power switch for receiving a different one of the switch control signals, said method comprising the steps of:

(a) generating at least one count signal;

(b) operating logic circuitry to generate trains of periodically occurring ramp control signals in response to the at least one count signal;

(c) generating a set of ramped voltages, wherein each of the ramped voltages is generated in response to a different one of the trains of periodically occurring ramp control signals;

(d) generating sets of trigger signal trains, wherein each of the trigger signal trains is generated in response to comparison of one of the ramped voltages with a feedback signal indicative of the output potential; and (e) generating the switch control signals in response to the trigger signal trains.

65. The method of claim 64, wherein step (e) includes the step of generating each of the switch control signals in response to a rotating sequence of the trains of trigger signals.

* * * * *